United States Patent
Kakadjian et al.

(10) Patent No.: US 11,492,545 B2
(45) Date of Patent: Nov. 8, 2022

(54) DUST SUPPRESSION COMPOSITIONS AND METHODS MAKING AND USING SAME

(71) Applicant: NexTier Completion Solutions Inc., Houston, TX (US)

(72) Inventors: Sarkis Kakadjian, Houston, TX (US); Jose Garza, Houston, TX (US); Marvin Solomon, Houston, TX (US)

(73) Assignee: NexTier Completion Solutions Inc., Houston, TX (US)

( * ) Notice: Subject to any disclaimer, the term of this patent is extended or adjusted under 35 U.S.C. 154(b) by 0 days.

(21) Appl. No.: 17/163,354

(22) Filed: Jan. 30, 2021

(65) Prior Publication Data

US 2021/0292640 A1    Sep. 23, 2021

Related U.S. Application Data

(62) Division of application No. 16/003,191, filed on Jun. 8, 2018, now Pat. No. 10,920,133.

(60) Provisional application No. 62/497,310, filed on Jun. 9, 2017.

(51) Int. Cl.
| | | |
|---|---|---|
| *C09K 8/82* | (2006.01) | |
| *C09K 8/80* | (2006.01) | |
| *C09K 3/22* | (2006.01) | |
| *E21B 43/267* | (2006.01) | |
| *C09K 8/62* | (2006.01) | |

(52) U.S. Cl.
CPC ............ *C09K 8/805* (2013.01); *C09K 3/22* (2013.01); *C09K 8/82* (2013.01); *C09K 8/62* (2013.01); *E21B 43/267* (2013.01)

(58) Field of Classification Search
CPC ........ B65D 11/1833; C09K 3/22; C09K 8/62; C09K 8/805; C09K 8/82; E21B 43/267
See application file for complete search history.

(56) References Cited

U.S. PATENT DOCUMENTS

| | | | |
|---|---|---|---|
| 4,650,598 A | 3/1987 | Roberts et al. | |
| 2008/0190160 A1* | 8/2008 | Tran ........................ | C05G 3/30 |
| | | | 252/384 |
| 2010/0000073 A1 | 1/2010 | Huang et al. | |
| 2016/0026490 A1 | 9/2016 | Johnsson et al. | |
| 2016/0272861 A1* | 9/2016 | Huang ..................... | C09K 3/22 |
| 2017/0088760 A1* | 3/2017 | Bahr ....................... | C09K 3/22 |

(Continued)

FOREIGN PATENT DOCUMENTS

| | | |
|---|---|---|
| CN | 1039946351 B | 8/2016 |
| WO | WO2016-06885 A1 | 5/2016 |
| WO | WO2016-089599 A1 | 6/2016 |

OTHER PUBLICATIONS

PCT International Search Report PCT/US2018/036585 dated Oct. 29, 2018.

(Continued)

*Primary Examiner* — Alicia Bland
(74) *Attorney, Agent, or Firm* — Robert W. Strozier

(57) ABSTRACT

Proppant dust suppression compositions including: (a) at least one sugar alcohol ester and (b) at least one sugar alcohol esters and methods for using the compositions, wherein the composition is adapted to reduce dust in a dust-containing material by about 30% and about 100% and wherein the at least one sugar alcohol ester improves flowability of treated dust-containing material.

20 Claims, 5 Drawing Sheets

(56) References Cited

U.S. PATENT DOCUMENTS

2017/0130010 A1   5/2017   O'Brien et al.

OTHER PUBLICATIONS

PCT Written Opinion PCT/US2018/036585 dated Oct. 29, 2018.
Brondz Fatty Acids—an overview _ ScienceDirect Topics printed Jun. 17, 2020.

* cited by examiner

DUST SUPPRESSION COMPOSITIONS AND METHODS MAKING AND USING SAME

RELATED APPLICATIONS

This application is a divisional of U.S. patent application Ser. No. 16/003,191 filed Jun. 8, 2018, now U.S. Pat. No. 10,920,133 issued Feb. 16, 2021, which claims priority to and the benefit of U.S. Provisional Patent Application Ser. No. 62/497,310 filed Jun. 9, 2017 (6 Jun. 2017).

BACKGROUND OF THE INVENTION

1. Field of the Invention

Embodiments of the present disclosure relate to dust suppression compositions and methods of making and using same, where the compositions are effective in the absence of glyerol or glycerine.

More particularly, embodiments of the present disclosure relate to dust suppression compositions and methods for using same, where the dust suppression compositions include: (a) at least one glyceride, or (b) at least one sugar alcohol ester, or (c) mixtures or combinations of at least one glyceride and at least on sugar alcohol ester. In certain embodiments, the compositions further include a pour point depressant. In certain embodiments, the methods include applying an effective amount of the composition to a dust-containing material during manufacturing operations, loading operations, transloading operations, vehicle loading operations, and/or on-site fracturing operations to for a treated dust-containing material, where the treated dust-containing material has between about 30% and about 100% dust reduction and wherein the at least one sugar alcohol ester, when present, improves flowability of the treated dust-containing material so that the treated dust-containing material has reduced screen out propensity, especially for such dust-containing materials such as proppants.

2. Description of the Related Art

Recently systems and methods for controlling silica dust during hydraulic fracturing operations have been applied to reduce crystalline silica mainly derived from proppant dust and reducing the dust below 50 microgram per liter in order to comply with new OSHA regulations to take place in 2018 (Administrative Control) and 2021 (Engineering Control).

Historically, dust control has been addressed by mechanical methods such as the methods disclosed in U.S. Pat. Nos. 9,162,261; 8,881,749; and 8,926,252. These methods generally include using a plurality of containers each having proppant, which are emptied onto a conveyor at a well site. The conveyor has a plurality of conveyor hoppers and each of the plurality of conveyor hoppers overlaying a conveyor belt. Each respective container has a sealed top to reduce the risk of release of silica dust associated with proppant into the air or use silos comprising of a trailer and a storage bin.

Chemical approaches include coatings to control dust such as the coatings disclosed in U.S. Pat. No. 7,081,270, which uses a binder consisting essentially of a carboxylic acid, an ester, or a thermoplastic polyolefin and a synthetic isoalkane. United States Published Application No. 20160251570 discloses an aqueous coating composition including from 2 to 65 weight percent of a surfactant, from 1 to 35 weight percent of a polymer binder that is a water insoluble emulsion polymer, and the balance water where the binder is composed of one ethylenically unsaturated monomer. United States Published Application No. 20040191401 discloses dust control compositions including between about 2 percent to about 60 percent by weight of a monosaccharide. United States Published Application No. 20130192835 discloses two polyionic materials, where the two polyionic materials contain ions counters to each other and forming at least two polyelectrolyte layers on the surface of the well treatment particulate. United States Published Application No. 20170088760 discloses biomaterials including bio-derived glycerides for a dust control agent for dust road surfaces.

Although dust control for proppants is a significant problem, dust control is also a problem in a number of other industries including mining, concrete manufacturing, road building, glass manufacturing, ceramic manufacturing, filler manufacturing, transporting, loading, and transloading, plastic manufacturing, ground rubber manufacturing, transporting, loading, and transloading, paint manufacturing, abrasive manufacturing, transporting, loading, and transloading, or the manufacturing of any product that utilizes dust-containing materials.

While many systems and methods have been purposed and used for dust suppression for dust-containing materials such as proppants used in fracturing operations, there is still a need in the art for other dust suppression compositions and methods for making and using same.

SUMMARY OF THE DISCLOSURE

Embodiments of this disclosure provide dust suppression compositions including: (a) at least one glyceride, or (b) at least one sugar alcohol ester, or (c) mixtures or combinations of at least one glyceride and at least on sugar alcohol ester. In certain embodiments, the dust suppression compositions include: (a) one mono-, di-, and/or tri-glyceride or a plurality of mono-, di-, and/or tri-glycerides (at least one mono-, di-, or tri-glyceride); or (b) one sugar alcohol ester or a plurality of sugar alcohol esters (at least one sugar alcohol ester); or (c) mixtures or combinations of one mono-, di-, and/or tri-glyceride or a plurality of mono-, di-, and/or tri-glycerides and one sugar alcohol ester or a plurality of sugar alcohol esters. In other embodiments, the dust suppression compositions include a glyceride or a plurality of glycerides (at least one glyceride). In other embodiments, the dust suppression compositions include a sugar alcohol esters or a plurality of sugar alcohol esters (at least one sugar alcohol ester). In other embodiments, the dust suppression compositions include (a) a glyceride or a plurality of glycerides (at least one glyceride), and (b) a sugar alcohol esters or a plurality of sugar alcohol esters (at least one sugar alcohol ester). The treated dust-containing material such as a proppant has between about 30% and about 100% dust reduction and wherein the at least one sugar alcohol ester improves flowability of the treated dust-containing material so that the treated dust-containing material has reduced screen out propensity. In other embodiments, the compositions also include at least one pour point depressant to reduce the pour point temperature to a desired lower pour point temperature.

Embodiments of this disclosure provide dust suppression methods that include applying an effective amount of a dust suppression composition of this disclosure to a dust-containing material such as a proppant or coal during manufacturing operations, loading operations, transloading operations, vehicle loading operations, and/or on-site operations such as fracturing operations using proppants. The treated dust-containing material has between about 30% and about 100% dust reduction and wherein the at least one sugar alcohol ester, when present, improves flowability of the treated dust-containing material so that the treated dust-containing material has reduced screen out propensity. In other embodiments, the compositions also include at least one pour point depressant to reduce the pour point temperature to a desired lower pour point temperature. In certain embodiments, the at least one pour point depressant is add in a concentration to lower the pour point temperature at or below −25° F., or at or below −27.5° F., or at or below −30° F. or at or below −32° F.

Embodiments of this disclosure provide treated dust-containing material including an effective amount of a dust suppression composition of this disclosure, where the dust suppression compositions reduce, substantially reduce, or completely eliminate dust during dust-containing material manufacturing operations, transporting operations, loading operations, transloading operations, vehicle loading operations, and/or on-site operations such as fracturing operations using a proppant.

Embodiments of this disclosure provide treated dust-containing materials including an effective amount of a dust suppression composition of this disclosure, wherein the compositions reduce, substantially reduce, or completely eliminate dust during manufacturing operations, loading operations, transloading operations, vehicle loading operations, and/or on-site operations and the dust-containing material has improved flowability, when a sugar alcohol esteri is present, compared to compositions including oil alone.

BRIEF DESCRIPTION OF THE DRAWINGS OF THE DISCLOSURE

The disclosure can be better understood with reference to the following detailed description together with the appended illustrative drawings in which like elements are numbered the same:

DEFINITIONS OF TERM USED IN THE DISCLOSURE

Figure 1:
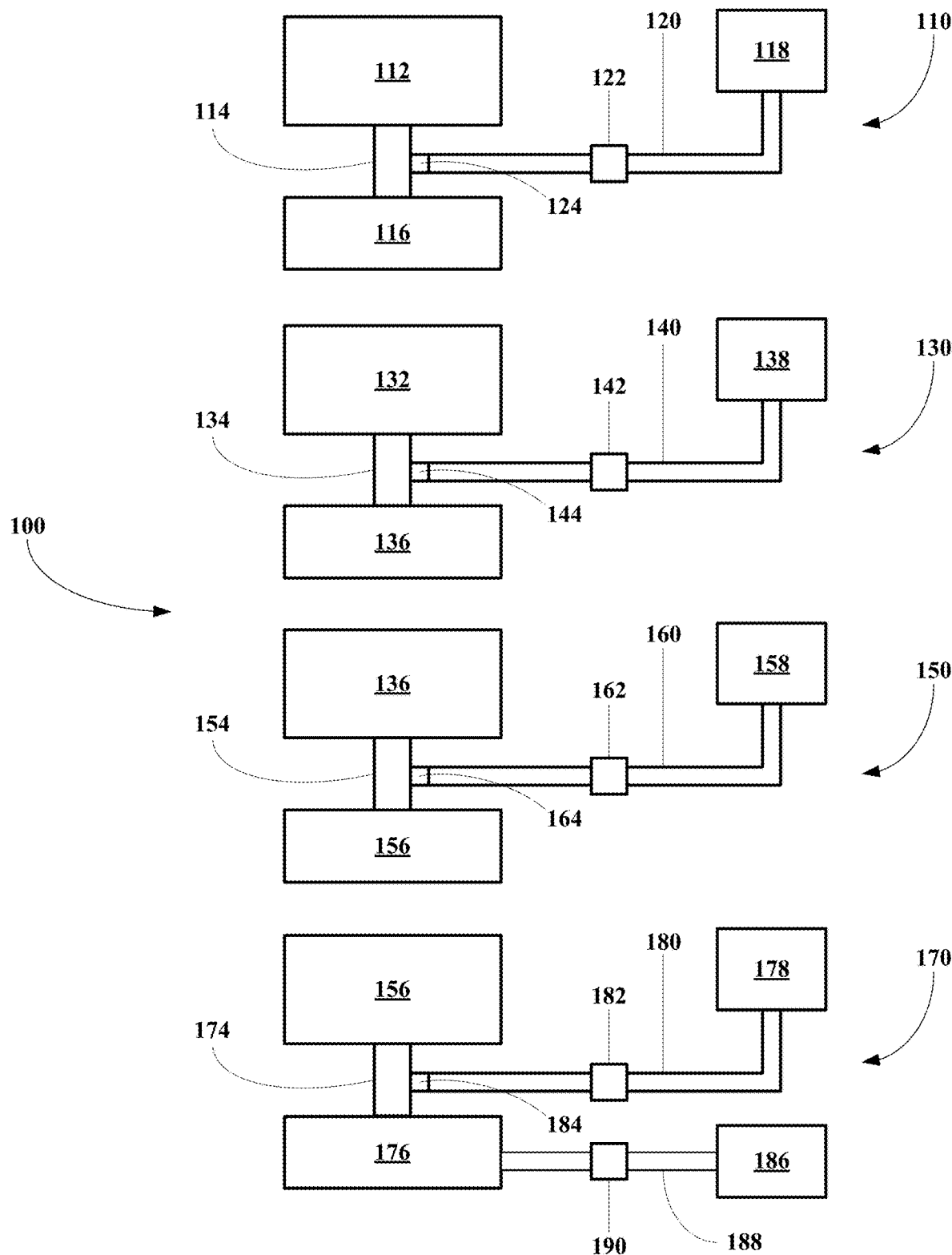
FIG. 1 depicts an embodiment of a general apparatus for reducing proppant dust.

The following definitions are provided in order to aid those skilled in the art in understanding the detailed description of the present disclosure.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" means that the value is within about 5% of the indicated value. In certain embodiments, the value is within about 2.5% of the indicated value. In certain embodiments, the value is within about 1% of the indicated value. In certain embodiments, the value is within about 0.5% of the indicated value. In certain embodiments, the value is within about 0.1% of the indicated value.

The term "fracturing" refers to the process and methods of breaking down a geological formation, i.e. the rock formation around a well bore, by pumping fluid at very high pressures, in order to increase production rates from a hydrocarbon reservoir. The fracturing methods of this disclosure use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present disclosure include, but are not limited to, conventional proppants familiar to those skilled in the art such as sand (e.g., 20-40 mesh sand, 30-50 mesh sand, 100 mesh sand, etc.), resin-coated sand, sintered bauxite, glass beads, and similar materials.

The term "fracturing layer" is used to designate a layer, or layers, of rock that are intended to be fractured in a single fracturing treatment. It is important to understand that a fracturing layer may include one or more than one of rock layers or strata as typically defined by differences in permeability, rock type, porosity, grain size, Young's modulus, fluid content, or any of many other parameters. That is, a fracturing layer is the rock layer or layers in contact with all the perforations through which fluid is forced into the rock in a given treatment. The operator may choose to fracture, at one time, a fracturing layer that includes water zones and hydrocarbon zones, and/or high permeability and low permeability zones (or even impermeable zones such as shale zones) etc. Thus a fracturing layer may contain multiple regions that are conventionally called individual layers, strata, zones, streaks, pay zones, etc., and we use such terms in their conventional manner to describe parts of a fracturing layer. Typically the fracturing layer contains a hydrocarbon reservoir, but the methods may also be used for fracturing water wells, storage wells, injection wells, etc. Note also that some embodiments of the disclosure are described in terms of conventional circular perforations (for example, as created with shaped charges), normally having perforation tunnels. However, the disclosure is may also be practiced with other types of perforations, for example openings or slots cut into the tubing by jetting.

The term "pour point depressant" is any compound that lowers a pour point temperature of a liquid dust suppression compositions of this disclosure.

The term "wt. %" means percent by weight based on the total weight of the composition.

The term "vol. %" means percent by volume based on the total volume of the composition.

The term "plurality" means two or more, more than two, greater than or equal to 2, or ≥2.

The term "at least one" means one or a plurality, one or more, greater than or equal to 1, or ≥1.

The term "gpt" means gallons per thousand gallons.

The term "ppt" means pounds per thousand gallons.

DETAILED DESCRIPTION OF THE DISCLOSURE

The inventors have found that a new approach for proppant dust suppression in fracturing operations using treated proppant treated, where the proppant may be treated during proppant manufacturing operations, proppant transloading operations, proppant vehicle loading operations, and/or on-site proppant fracturing operations and where the treating compositions include at least one biomaterial. The inventors have found that the dust suppression compositions of this disclosure may represent a more cost effective and lower concentration alternative to currently internally used dust suppression systems. Besides being more effective, the dust suppression compositions of this disclosure are more environmentally friendly than currently internally used dust suppression systems. The treated proppant has between about 30% and 100% proppant dust reduction and where the at least one sugar alcohol ester, when present, improves flowability of the treated proppant so that the treated proppant has reduced screen out propensity. In certain embodiments, the compositions also include a pour point depressant in an amount sufficient to reduce a pour point temperature of the compositions at or below −25° F., or at or below −27.5° F., or at or below −30° F. or at or below −32° F. The sufficient amount of pour point depressant is between about 0.1 wt. % and about 5 wt. %, or between about 0.1 wt. % and about 4 wt. %, or between about 0.1 wt. % and about 3 wt. %, or between about 0.1 wt. % and about 2 wt. %, or between about 0.5 wt. % and about 2 wt. %, or between about 1 wt. % and about 2 wt. %, or about 2 wt. %.

Unlike water based dust suppression systems that include, which although environmentally friendly may cake dust-containing materials such as proppants at high concentrations and cause dust-containing material screen out of dust-containing materials such as proppants, the dust suppression compositions of this disclosure do not include water and result in reduced (e.g., proppant) caking and screening out. Additionally, unlike solvent based dust suppression systems, which require high concentrations to control dust and have a limitation to not run in at concentrations no higher than 1000 mg/L, the dust suppression compositions of this disclosure do not include a solvent and may be used in reduced concentration without encountering run in limitations.

Embodiments of this disclosure broadly relate to dust suppression compositions including a least one biomaterial having properties that effectively reduce dust in dust-containing materials operations utilizing the dust-containing materials such as proppants used in fracturing operations. In certain embodiment, the at least one biomaterial includes: (a) a glyceride or a plurality of glycerides (at least one glyceride), or (b) a sugar alcohol esters or a plurality of sugar alcohol esters (at least one sugar alcohol ester), or (c) mixtures and combinations thereof. In other embodiment, the dust suppression compositions of this disclosure are free or substantially free of water or any other aqueous solution. In other embodiment, the dust suppression compositions of this disclosure are free or substantially free of solvent or a solvent system. In other embodiments, the compositions include 100 vol. % of at least one glyceride administered to a dust-containing material at treating levels between about 0.10% v/w and about 0.5% v/w. In other embodiments, the dust suppression compositions include 100 vol. % of at least one sugar alcohol ester administered to a dust-containing material at treating levels between about 0.10% v/w and about 0.5% v/w. In certain embodiments, the compositions include between about 99.9 vol. % and about 0.1 vol. % of at least one glyceride and between about 0.1 vol. % and about 99.9 vol. % of at least one sugar alcohol ester administered to a dust-containing material at treating levels between 0.10% v/w and about 0.5% v/w. In certain embodiments, the compositions include between about 99 vol. % and about 60 vol. % of at least one glyceride and between about 1 vol. % and about 40 vol. % of at least one sugar alcohol ester administered to a dust-containing material at treating levels between 0.10% v/w and about 0.5% v/w. In certain embodiments, the compositions include between about 99 vol. % and about 70 vol. % of at least one glyceride and between about 1 vol. % and about 30 vol. % of at least one sugar alcohol ester administered to a dust-containing material at treating levels between 0.10% v/w and about 0.5% v/w. In certain embodiments, the compositions also include a pour point depressant in an amount sufficient to reduce a pour point temperature of the compositions at or below −25° F., or at or below −27.5° F., or at or below −30° F. or at or below −32° F. The sufficient amount of pour point depressant is between about 0.1 wt. % and about 5 wt. %, or between about 0.1 wt. % and about 4 wt. %, or between about 0.1 wt. % and about 3 wt. %, or between about 0.1 wt. % and about 2 wt. %, or between about 0.5 wt. % and about 2 wt. %, or between about 1 wt. % and about 2 wt. %, or about 2 wt. %.

Embodiments of this disclosure broadly relate to methods including treating a dust-containing material (e.g., proppant) with an effective amount of a dust suppression composition including a least one biomaterial having properties that effectively reduce dust-containing material (e.g., proppant) dust used in fracturing operations. The treating step may be performed during dust-containing material manufacturing operations, transporting operations, loading operations, transloading operations, vehicle loading operations, and/or on-site operations such as treating proppant during fracturing operations. In certain embodiments, the treating step comprising applying the effective amount of a dust suppression composition of this disclosure to dust-containing material (e.g., proppant) exiting a dust-containing material formation unit or a dust-containing material commutating unit or particle reduction unit. In certain embodiments, the applying step comprises an applying unit that contacts the composition with a dust-containing material as it exits the a dust-containing material formation unit or a dust-containing material commutating unit or particle size reduction unit. In certain embodiments, the applying unit comprises nozzles, injectors, sprayers, nebulizers, and/or atomizers. In other embodiments, the applying unit includes a flow controller and metering unit that controls the amount of dust suppression composition being applied to the proppant. In certain embodiment, the at least one biomaterial includes: (a) a glyceride or a plurality of glycerides (at least one glyceride), or (b) a sugar alcohol esters or a plurality of sugar alcohol esters (at least one sugar alcohol ester), or (c) mixtures and combinations thereof. In other embodiment, the dust suppression compositions of this disclosure are free or substantially free of water or any other aqueous solution. In other embodiment, the dust suppression compositions of this disclosure are free or substantially free of solvent or a solvent system. The treated dust-containing material has between about 30% and about 100% proppant dust reduction and wherein the at least one sugar alcohol ester, when present, improves flowability of the treated dust-containing material so that the treated dust-containing material has reduced screen out propensity, especially when using proppants during fracturing operations.

In certain embodiments, the compositions include between about 100 vol. % of at least one glyceride at treating levels between about 0.1% v/w and about 0.5% v/w. In other embodiments, the compositions include between about 100 vol. % of at least one sugar alcohol ester at treating levels between about 0.1% v/w and about 0.5% v/w. In other embodiments, the compositions include any mixture of at least one glyceride and at least one sugar alcohol ester at treating levels between about 0.1% v/w and about 0.5% v/w. The treated proppant has between about 30% and about 100% proppant dust reduction and where the at least one sugar alcohol ester, when present, improves flowability of the treated proppant so that the treated proppant has reduced screen out propensity. In certain embodiments, the compositions also include a pour point depressant in an amount sufficient to reduce a pour point temperature of the compositions at or below −5° F. at or below −10° F., at or below −15° F., at or below −20° F., or at or below −25° F.

Embodiments of this disclosure broadly relates to dust suppression compositions including (a) between about 0 wt. % and about 100 wt. % of at least one sugar alcohol ester, and (b) between about 100 wt. % and about 0 wt. % of at least one glyceride, wherein the composition reduces dust of a dust-containing material from about 30% to about 100% and wherein the at least one sugar alcohol ester, when present, improves flowability and reduces screen out propensity of a treated dust-containing material. In certain embodiments, the compositions may further including (c) between about 0.1 wt. % and about 5 wt. % at least one pour point depressant, wherein the at least one pour point depressant is/are selected from the group consisting of polymethacrylates, polyacrylates, acrylate-styrene copolymers, esterified olefin polymers or copolymers, styrene maleic anhydride copolymers, alkylated polystyrenes, and vinyl acetate-fumarate copolymers, poly alpha olefins, and mixtures thereof. In other embodiments, the composition further include a plurality of sugar alcohol esters and/or plurality of glycerides. In other embodiments, the composition may further include (a) between about 99.9 vol. % and about 0.1 vol. % of at least one glyceride, or between about 95 vol. % and about 5 vol. % of at least one glyceride, or between about 90 vol. % and about 10 vol. % of at least one glyceride, or between about 80 vol. % and about 20 vol. % of at least one glyceride, or between about 70 vol. % and about 30 vol. % of at least one glyceride, and (b) between about 0.1 vol. % and 99.9 vol. % of at least one sugar alcohol ester, or between 5 vol. % and 95 vol. % at least one sugar alcohol ester, or between 10 vol. % and 90 vol. % at least one sugar alcohol ester, or between 20 vol. % and 80 vol. % at least one sugar alcohol ester, or between 30 vol. % and 70 vol. % at least one sugar alcohol ester. In other embodiments, the composition may further include (c) between about 0.1 wt. % and about 5 wt. % at least one pour point depressant, wherein the at least one pour point depressant is/are selected from the group consisting of polymethacrylates, polyacrylates, acrylate-styrene copolymers, esterified olefin polymers or copolymers, styrene maleic anhydride copolymers, alkylated polystyrenes, and vinyl acetate-fumarate copolymers, poly alpha olefins, and mixtures thereof. In other embodiments, the composition may further include a plurality of sugar alcohol esters and/or plurality of glycerides. In other embodiments, the at least one glyceride comprises at least one compound of the general formula (I), wherein $Z^1$, $Z^2$, and $Z^3$ are hydroxyl groups (OH group) or ester groups (OC(=O)R), where each R group has between 4 and 40 carbon atoms; provided, however, the one of $Z^1$, $Z^2$, and $Z^3$ are not all hydroxyl groups. In other embodiments, the at least one glyceride comprises a monoglyceride of formula (IA), a diglyceride of formula (IB), a triglyceride of formula (IC), or mixtures and combinations thereof, wherein $R^1$, $R^2$, and $R^3$ are hydrocaryl groups having between 4 and 40 carbon atoms. In other embodiments, the $R^1$ group of the monoglycerides of formula (IA) includes $C_4$-$C_{40}$ fatty acid, the $R^1$ and $R^2$ groups of the diglycerides of formula (IB) include independently $C_4$-$C_{40}$ fatty acids, and the $R^1$, $R^2$, and $R^3$ groups of the triglycerides of formula (IC) include independently $C_4$-$C_{40}$ fatty acids. In other embodiments, the at least one glyceride comprises at least one vegetable oils selected from the group consisting of coconut oil, corn oil, cottonseed oil, olive oil, palm oil, peanut oil, rapeseed oil, safflower oil, sesame oil, soybean oil, sunflower oil, almond oil, beech nut oil, brazil nut oil, cashew oil, hazelnut oil, macadamia oil, mongongo nut oil, pecan oil, pine nut oil, pistachio oil, walnut oil, grapefruit seed oil, bitter gourd oil, bottle gourd oil, buffalo gourd oil, butternut squash seed oil, egusi seed oil, pumpkin seed oil, watermelon seed oil, acai oil, black seed oil, blackcurrant seed oil, borage seed oil, evening primrose oil, flaxseed oil, amaranth oil, apricot oil, apple seed oil, argan oil, avocado oil, babassu oil, ben oil, borneo tallow nut oil, cape chestnut oil, carob pod oil (algaroba oil), cocoa butter, cocklebur oil, cohune oil, coriander seed oil, date seed oil, dika oil, grape seed oil, hemp oil, kapok seed oil, kenaf seed oil, lallemantia oil, mafura oil, marula oil, meadowfoam seed oil, mustard oil (pressed), niger seed oil, poppyseed oil, nutmeg butter, okra seed oil, papaya seed oil, perilla seed oil, persimmon seed oil, pequi oil, pili nut oil, pomegranate seed oil, poppyseed oil, pracaxi oil, virgin pracaxi oilprune kernel oil, quinoa oil, ramtil oil, rice bran oil, royle oil, shea butter, sacha inchi oil, sapote oil, seje oil, taramira oil, tea seed oil (camellia oil), thistle oil, tigernut oil (or nut-sedge oil), tobacco seed oil, tomato seed oil, wheat germ oil, or mixtures and combinations thereof. In other embodiments, the at least one sugar alcohol ester comprises at least one compound of the general formula (III), wherein $Z^4$, each $Z^5$, and $Z^6$ are hydroxyl groups (OH group) or ester groups (OC(=)R), where each R group has between 4 and 40 carbon atoms and cyclic derivatives thereof; provided, however, the one of $Z^4$, $Z^6$, and $Z^7$ are not all hydroxyl groups and n is an integer having a value between 2 and 8. In other embodiments, the at least one sugar alcohol ester is selected from the group consisting of erythritol esters, threitol esters, arabitol esters, xylitol esters, ribitol esters, mannitol esters, sorbitol esters, galactitol esters, fucitol esters, iditol esters, inositol esters, volemitol esters, isomalt esters, maltitol esters, lactitol esters, maltotriitol esters, maltotetraitol esters, cyclic derivatives thereof, other sugar alcohols, or mixtures and combinations thereof. In other embodiments, the at least one sugar alcohol esters comprises at least one fatty acid sugar alcohol ester, where the fatty acid include a $C_4$ to $C_{40}$ fatty acid. In other embodiments, the at least one sugar alcohol esters comprises at least one sorbitol and/or sorbitan fatty acid ester.

Embodiments of this disclosure broadly relates to treated dust-containing material compositions including a dust-containing material, and an effective amount of a dust suppression composition including (a) between about 0 wt. % and about 100 wt. % of at least one sugar alcohol ester, and (b) between about 100 wt. % and about 0 wt. % of at least one glyceride, wherein the composition reduces dust of a dust-containing material from about 30% to about 100% and wherein the at least one sugar alcohol ester, when present, improves flowability and reduces screen out propensity of a treated dust-containing material. In certain embodiments,
the composition may further include (c) between about 0.1 wt. % and about 5 wt. % at least one pour point depressant, wherein the at least one pour point depressant is/are selected from the group consisting of polymethacrylates, polyacrylates, acrylate-styrene copolymers, esterified olefin polymers or copolymers, styrene maleic anhydride copolymers, alkylated polystyrenes, and vinyl acetate-fumarate copolymers, poly alpha olefins, and mixtures thereof. In other embodiments, the composition may further include a plurality of sugar alcohol esters and/or plurality of glycerides. In other embodiments, the composition may further include (a) between about 99.9 vol. % and about 0.1 vol. % of at least one glyceride, or between about 95 vol. % and about 5 vol. % of at least one glyceride, or between about 90 vol. % and about 10 vol. % of at least one glyceride, or between about 80 vol. % and about 20 vol. % of at least one glyceride, or between about 70 vol. % and about 30 vol. % of at least one glyceride, and (b) between about 0.1 vol. % and 99.9 vol. % of at least one sugar alcohol ester, or between 5 vol. % and 95 vol. % at least one sugar alcohol ester, or between 10 vol. % and 90 vol. % at least one sugar alcohol ester, or between 20 vol. % and 80 vol. % at least one sugar alcohol ester, or between 30 vol. % and 70 vol. % at least one sugar alcohol ester. In other embodiments, the composition may further include (c) between about 0.1 wt. % and about 5 wt. % at least one pour point depressant, wherein the at least one pour point depressant is/are selected from the group consisting of polymethacrylates, polyacrylates, acrylate-styrene copolymers, esterified olefin polymers or copolymers, styrene maleic anhydride copolymers, alkylated polystyrenes, and vinyl acetate-fumarate copolymers, poly alpha olefins, and mixtures thereof.

Embodiments of this disclosure broadly relates to methods including applying an effective amount of a proppant dust suppression composition to a proppant to form a reduced dust forming or treated proppant composition, wherein the proppant dust suppression composition include (a) at least one sugar alcohol ester, or (b) a mixture of the at least one sugar alcohol ester and at least one glyceride, wherein the composition reduces dust of a dust-containing material from about 30% to about 100% and wherein the at least one sugar alcohol ester, when present, improves flowability and reduces screen out propensity of a treated dust-containing material.

Compositional Ranges of the Disclosure

Oil Based Dust Suppression Compositions

Embodiments of the compositions of this disclosure are set forth in Table I:

TABLE I

Oil Based Dust Suppression Compositions

| Glycerides | Sugar Alcohol Esters | Glycerides | Sugar Alcohol Esters |
|---|---|---|---|
| 0 wt. % | 100 wt. % | 100 wt. % | 0 wt. % |
| about 0.1 wt. % | about 99.9 wt. % | about 99.9 wt. % | about 0.1 wt. % |
| about 0.5 wt. % | about 99.5 wt. % | about 99.5 wt. % | about 0.5 wt. % |
| about 1 wt. % | about 99 wt. % | about 99 wt. % | about 1 wt. % |
| about 5 wt. % | about 95 wt. % | about 95 wt. % | about 5 wt. % |
| about 10 wt. % | about 90 wt. % | about 90 wt. % | about 10 wt. % |
| about 15 wt. % | about 85 wt. % | about 85 wt. % | about 15 wt. % |
| about 20 wt. % | about 80 wt. % | about 80 wt. % | about 20 wt. % |
| about 25 wt. % | about 75 wt. % | about 75 wt. % | about 25 wt. % |
| about 30 wt. % | about 70 wt. % | about 70 wt. % | about 30 wt. % |
| about 35 wt. % | about 65 wt. % | about 65 wt. % | about 35 wt. % |
| about 40 wt. % | about 60 wt. % | about 60 wt. % | about 40 wt. % |
| about 45 wt. % | about 55 wt. % | about 55 wt. % | about 45 wt. % |
| about 50 wt. % | about 50 wt. % | about 50 wt. % | about 50 wt. % |

Embodiments of this disclosure include treating the particulate proppant with an effective amount of a composition of this disclosure, where the effective amount is sufficient to suppress or reduce proppant dust. In certain embodiments, the effective amount range between a lower amount and a upper amount. In other embodiments, the lower amount may be about 5 ppm, about 25 ppm, about 50 ppm, about 100 ppm, about 150 ppm, about 200 ppm, about 250 ppm, about 300 ppm, 350 ppm, about 400 ppm, about 450 ppm, about 500 ppm, about 550 ppm, about 600 ppm, 650 ppm, about 700 ppm, about 750 ppm, about 800 ppm, about 850 ppm, about 900 ppm, 950 ppm, or about 1,000 ppm; while the upper amount may be about 1,250 ppm, about 1,500 ppm, about 1,750 ppm, about 2,000 ppm, about 2,250 ppm, about 2,500 ppm, about 2,750 ppm, about 3,000 ppm, about 3,250 ppm, about 3,500 ppm, about 3,750 ppm, about 4,000 ppm, about 4,250 ppm, 4,500 ppm, about 4,750 ppm, or about 5,000 ppm. All possible combinations of the lower amounts and the upper amounts are covered. Thus, the broadest effective amount ranges between about 5 ppm and about 5,000 ppm; while the narrowest effective amount is between about 1,000 pm and about 1,250 ppm.

Suitable Reagents/Devices Used in the Disclosure

Dust-Containing Materials

Suitable dust-containing materials include, without limitation, proppant materials, particulate ceramic materials, particulate filler materials, glass manufacturing materials, particulate carbonaceous materials, particulate abrasive materials, particulate plastic materials, concrete materials, particulate scouring materials, particulate metal materials, particulate rubber materials, any other solid material that includes dust (fine particulate material), or mixtures of combinations thereof.

Exemplary examples of proppant materials, particulate ceramic materials, particulate filler materials, glass manufacturing materials, particulate abrasive materials, particulate plastic materials, concrete materials, particulate scouring materials, and/or particulate metal materials include, without limitation, metals, metal oxides, natural or synthetic particulate materials, plastics, other polymeric solids, solid materials derived from plants, any other solid material or mixtures and combinations thereof.

Exemplary particulate metals include, without limitation, particulate iron and iron alloys, particulate aluminum and aluminum alloys, particular copper and copper alloys, other particular metals, or mixtures and combinations thereof.

Exemplary metal oxides include, without limitation, any solid oxide of a metallic element of the periodic table of elements. Exemplary metal oxides and ceramics include, without limitation, actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, zeolites, ceramic structures prepared from one or more of these oxides and mixed metal oxides including two or more of the above listed metal oxides, and mixtures or combinations thereof.

Exemplary particulate plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Besides that above materials, exemplary particulate abrasive and scouring materials include, without limitation, particulate diamond, other particulate precious stones, semi-precious stones, particulate carborundum, particulate tungsten, other abrasive and scouring materials, or mixtures and combinations thereof.

Exemplary particulate carbonaceous metals include, without limitation, all type of coal, lignite, gilsonite, peat, saw dust, other carbonaceous materials, and mixtures or combinations thereof.

Besides that above materials, exemplary particulate fillers include, without limitation, carbon blacks, fumed silicas, zeolites, or mixtures and combinations thereof.

Biomaterials

Suitable biomaterials for use in the dust suppression compositions of this disclosure include, without limitation, esters of glycerol, esters of other sugar alcohols, cyclic derivations of sugar alcohols, or mixtures and combinations thereof.

Glycerides

Suitable glycerides include, without limitation, compounds of the general formula (I):

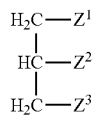

(I)

where $Z^1$, $Z^2$, and $Z^3$ are hydroxyl groups (OH group) or ester groups (OC(=O)R), where each R group has between 4 and 40 carbon atoms; provided, however, the one of $Z^1$, $Z^2$, and $Z^3$ are not all hydroxyl groups. In certain embodiments, the ester groups are derived from fatty acid esters, where the fatty acids.

In other embodiments, the glycerides include mono glycerides of general formula (IA), diglycerides of general formula (IB), and/or triglycerides of general formula (IC):

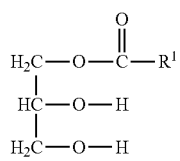

(IA)

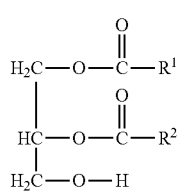

(IB)

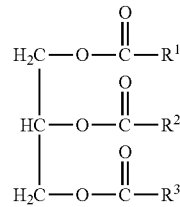

(IC)

where $R^1$, $R^2$, and $R^3$ are hydrocaryl groups having between 4 and 40 carbon atoms. In other embodiments, the $R^1$ group of the monoglycerides of formula (IA) includes $C_4$-$C_{40}$ fatty acid. In other embodiments, the $R^1$ and $R^2$ groups of the diglycerides of formula (IB) include independently $C_4$-$C_{40}$ fatty acids. In other embodiments, the $R^1$, $R^2$, and $R^3$ groups of the triglycerides of formula (IC) include independently $C_4$-$C_{40}$ fatty acids.

Natural Glycerides

Suitable natural glycerides include, without limitation, monoglycerides, diglycerides, triglycerides, or mixtures and combinations thereof, where the glyceride are mono-, di-, and/or tri-esters of glycerol derived from vegetable oils. Exemplary examples of vegetable oils include, without limitation, coconut oil, corn oil, cottonseed oil, olive oil, palm oil, peanut oil, rapeseed oil, safflower oil, sesame oil, soybean oil, sunflower oil, almond oil, beech nut oil, brazil nut oil, cashew oil, hazelnut oil, macadamia oil, mongongo nut oil, pecan oil, pine nut oil, pistachio oil, walnut oil, grapefruit seed oil, bitter gourd oil, bottle gourd oil, buffalo gourd oil, butternut squash seed oil, egusi seed oil, pumpkin seed oil, watermelon seed oil, açaí oil, black seed oil, blackcurrant seed oil, borage seed oil, evening primrose oil, flaxseed oil, amaranth oil, apricot oil, apple seed oil, argan oil, avocado oil, babassu oil, ben oil, borneo tallow nut oil, cape chestnut oil, carob pod oil (algaroba oil), cocoa butter, cocklebur oil, cohune oil, coriander seed oil, date seed oil, dika oil, grape seed oil, hemp oil, kapok seed oil, kenaf seed oil, lallemantia oil, mafura oil, marula oil, meadowfoam seed oil, mustard oil (pressed), niger seed oil, poppyseed oil, nutmeg butter, okra seed oil, papaya seed oil, perilla seed oil, persimmon seed oil, pequi oil, pili nut oil, pomegranate seed oil, poppyseed oil, pracaxi oil, virgin pracaxi oil prune kernel oil, quinoa oil, ramtil oil, rice bran oil, royle oil, shea butter, sacha inchi oil, sapote oil, seje oil, taramira oil, tea seed oil (camellia oil), thistle oil, tigernut oil (or nut-sedge oil), tobacco seed oil, tomato seed oil, wheat germ oil, or mixtures and combinations thereof. Synthetic glycerides include, without limitation, any synthetic monoglyceride, diglyceride, triglyceride, or mixtures and combinations thereof.

Sugar Alcohols

Suitable sugar alcohols for use in this disclosure include, without limitation, sugar alcohols of the general formula (II):

$HOCH_2(CHOH)_nCH_2OH$ (II)

where n is an integer having a value between 2 and 8 and cyclic derivatives thereof; also sometimes called alditols. In certain embodiments, the sugar alcohols include, without limitation, tetritols, pentitols, hexitols, heptitols, and mixtures or combinations thereof and any of their stereoisomers. Exemplary examples of sugar alcohols include, without limitation, erythritol, threitol, arabitol, xylitol, ribitol, mannitol, sorbitol, galactitol, fucitol, iditol, inositol, volemitol, isomalt, maltitol, lactitol, maltotriitol, maltotetraitol, cyclic derivatives thereof, other sugar alcohols, or mixtures and combinations thereof.

Sugar Alcohol Esters

Suitable sugar alcohols for use in this disclosure include, without limitation, sugar alcohols of the general formula (III):

$$Z^4OCH_2(CHOZ^5)_nCH_2OZ^6 \qquad (III)$$

where $Z^4$, each $Z^5$, and $Z^6$ are hydroxyl groups (OH group) or ester groups (OC(=O)R), where each R group has between 4 and 40 carbon atoms and cyclic derivatives thereof; provided, however, the one of $Z^4$, $Z^6$, and $Z^7$ are not all hydroxyl groups and n is an integer having a value between 2 and 8. Exemplary examples of sugar alcohol esters include, without limitation, erythritol esters, threitol esters, arabitol esters, xylitol esters, ribitol esters, mannitol esters, sorbitol esters, galactitol esters, fucitol esters, iditol esters, inositol esters, volemitol esters, isomalt esters, maltitol esters, lactitol esters, maltotriitol esters, maltotetraitol esters, cyclic derivatives thereof, other sugar alcohols, or mixtures and combinations thereof. In certain embodiments, the are mono-esters, di-esters, and up to the maximum number of hydroxy units in the structure. For example, volemitol can take up to seven ester units. In certain embodiments, the sugar alcohol esters are fatty acid esters, where the fatty acids include $C_4$ to $C_{40}$ fatty acids. In certain embodiments, the sugar alcohols include one or a plurality of sorbitol and/or sorbitan fatty acid esters. In other embodiments, the sugar alcohols include one or a plurality of sorbitol and/or sorbitan $C_{14}$-$C_{22}$ fatty acid esters. In other embodiments, the sugar alcohols include one or a plurality of sorbitol and/or sorbitan $C_{16}$-$C_{20}$ fatty acid esters. In other embodiments, the sugar alcohols include one or a plurality of sorbitol and/or sorbitan $C_{18}$ fatty acid esters. In other embodiments, the sorbitol fatty acid esters include mono-, di-, tri-, tetra, penta-, or hexa sorbitol fatty acid esters and/or sorbitan fatty acid esters include mono-, di-, tri-, or tetra-sorbitan fatty acid esters.

Fatty Acids

Suitable fatty acids for use in this disclosure include, without limitation, any linear or branched saturated fatty acid or linear or branched unsaturated fatty acids or mixtures and combinations thereof having the general formula R'—COOH, where R' is a hydrocarbyl group having between four and 40 carbon atoms with sufficient hydrogen atoms to complete the vacancy. Exemplary fatty acids include short chain fatty acids (SCFA), medium chain fatty acids (MCFA), long chain fatty acids (LCFA), very-long-chain fatty acids (VLCFA) and mixtures or combinations thereof. SCFA include fatty acids having a carbyl tail group having less than between 4 and less than 8 carbon atoms ($C_4$ to $C_8$). MCFA include fatty acids having a carbyl group having between 8 and less than 14 carbon atoms ($C_8$ to $C_{14}$). LCFA include fatty acids having a carbyl group having between 14 and 24 carbon atoms ($C_{14}$-$C_{24}$). VLCFA include fatty acids having a carbyl group having greater than 24 carbon atoms (>$C_{24}$), generally greater than 24 carbon atoms up to about 40 carbon atoms or more. Exemplary unsaturated fatty acids include, without limitation, myristoleic acid [$CH_3(CH_2)_3CH=CH(CH_2)_7COOH$, cis-$\Delta^9$, C:D 14:1, n-5], palmitoleic acid [$CH_3(CH_2)_5CH=CH(CH_2)_7COOH$, cis-$\Delta^9$, C:D 16:1, n-7], sapienic acid [$CH_3(CH_2)_8CH=CH(CH_2)_4COOH$, cis-$\Delta^6$, C:D 16:1, n-10], oleic acid [$CH_3(CH_2)_7CH=CH(CH_2)_7COOH$, cis-$\Delta^9$, C:D 18:1, n-9], linoleic acid [$CH_3(CH_2)_4CH=CHCH_2CH=CH(CH_2)_7COOH$, cis,cis-$\Delta^9,\Delta^{12}$, C:D 18:2, n-6], α-Linolenic acid [$CH_3CH_2CH=CHCH_2CH=CHCH_2CH=CH(CH_2)_7COOH$, cis,cis,cis-$\Delta^9,\Delta^{12},\Delta^{15}$, C:D 18:3, n-3], arachidonic acid [$CH_3(CH_2)_4CH=CHCH_2CH=CHCH_2CH=CHCH_2CH=CH(CH_2)_3COOH$, cis,cis,cis,cis-$\Delta^5,\Delta^8,\Delta^{11},\Delta^{14}$, C:D 20:4, n-6], eicosapentaenoic acid [$CH_3CH_2CH=CHCH_2CH=CHCH_2CH=CHCH_2CH=CHCH_2CH=CH(CH_2)_3COOH$], cis,cis,cis,cis,cis-$\Delta^5,\Delta^8,\Delta^{11},\Delta^{14},\Delta^{17}$, 20:5, n-3], erucic acid [$CH_3(CH_2)_7CH=CH(CH_2)_{11}COOH$, cis-$\Delta^{13}$, C:D 22:1, n-9], docosahexaenoic acid [$CH_3CH_2CH=CHCH_2CH=CHCH_2CH=CHCH_2CH=CHCH_2CH=CHCH_2CH=CH(CH_2)_2COOH$, cis,cis,cis,cis,cis-$\Delta^4,\Delta^7,\Delta^{10},\Delta^{13},\Delta^{16},\Delta^{19}$, a C:D 22:6, n-3], or mixtures and combinations thereof.

Exemplary saturated fatty acids include, without limitation, lauric acid [$CH_3(CH_2)_{10}COOH$, C:D 12:0], myristic acid [$CH_3(CH_2)_{12}COOH$, C:D 14:0], palmitic acid [$CH_3(CH_2)_{14}COOH$, C:D 16:0], stearic acid [$CH_3(CH_2)_{16}COOH$, C:D 18:0], arachidic acid [$CH_3(CH_2)_{18}COOH$, C:D 20:0], behenic acid [$CH_3(CH_2)_{20}COOH$, C:D 22:0], lignoceric acid [$H_3(CH_2)_{22}COOH$, C:D 24:0], cerotic acid [$CH_3(CH_2)_{24}COOH$, C:D 26:0], or mixture or combinations thereof.

Exemplary saturated fatty acids include, without limitation, butyric ($C_4$), valeric ($C_5$), caproic ($C_6$), enanthic ($C_7$), caprylic (CO, pelargonic ($C_9$), capric ($C_{10}$), undecylic ($C_{11}$), lauric ($C_{12}$), tridecylic ($C_{13}$), myristic ($C_{14}$), pentadecylic ($C_{15}$), palmitic ($C_{16}$), margaric ($C_{17}$), stearic ($C_{18}$), nonadecylic ($C_{19}$), arachidic ($C_{20}$), heneicosylic ($C_{21}$), behenic ($C_{22}$), tricosylic ($C_{23}$), lignoceric ($C_{24}$), pentacosylic ($C_{25}$), cerotic ($C_{26}$), heptacosylic ($C_{27}$), montanic ($C_{28}$), nonacosylic ($C_{29}$), melissic ($C_{30}$), hentriacontylic ($C_{31}$), lacceroic ($C_{32}$), psyllic ($C_{33}$), geddic ($C_{34}$), ceroplastic ($C_{35}$), hexatriacontylic ($C_{36}$) and mixtures or combinations thereof. Unsaturated fatty acids include, without limitation, n-3 unsaturated fatty acids such as α-linolenic acid, stearidonic acid, eicosapentaenoic acid, and docosahexaenoic acid, n-6 unsaturated fatty acids such as linoleic acid, γ-linolenic acid, dihomo-γ-linolenic acid, and arachidonic acid, n-9 unsaturated fatty acids oleic acid, elaidic acid, eicosenoic acid, erucic acid, nervonic acid, mead acid and mixtures or combinations thereof Pour Point Depressant Suitable pour point depressants include, without limitation, pour point depressants based on polymethacrylates, polyacrylates, acrylate-styrene copolymers, esterified olefin polymers or copolymers, styrene maleic anhydride copolymers, alkylated polystyrene polymers, vinyl acetate-fumarate copolymers, poly alpha olefins, and mixtures or combinations.

DETAILED DESCRIPTION OF THE DRAWINGS OF THE DISCLOSURE

General Apparatus

Referring now to FIG. 1, an embodiment of an apparatus of the disclosure, generally 100, is shown to include a dust-containing material (e.g., proppant) manufacturing/production facility 110, a transloading facility 130, an on-site dust-containing material storage facility 150, and an on-site fracturing fluid mixing facility 170.

The dust-containing material manufacturing/production facility 110 includes a dust-containing material manufacturing unit 112 having a dust-containing material manufacturing outlet conduit 114 connected to a manufacturing facility storage unit 116. The dust-containing material manufacturing/production facility 110 also includes a first treatment fluid reservoir 118 including a first treatment outlet conduit 120 and a first treatment pump/flow controller 122. The first treatment outlet conduit 120 is connected to the dust-containing material manufacturing outlet conduit 114 at a first treatment end unit 124, where the first treatment end unit 124 may be an injector, a sprayer, or any other liquid injection system for introducing a liquid into a solid particulate material.

The transloading facility 130 includes a dust-containing material transloading unit 132 having a proppant transloading outlet conduit 134 connected to a transportation unit 136. The transloading facility 130 also includes a second treatment fluid reservoir 138 including a second treatment outlet conduit 140 and a second treatment pump/flow controller 142. The second treatment outlet conduit 140 is connected to the dust-containing material transloading outlet conduit 134 at a second treatment end unit 144, where the first treatment end unit 144 may be an injector, a sprayer, or any other liquid injection system for introducing a liquid into a solid particulate material.

The on-site dust-containing material storage facility 150 includes the transportation unit 136 having an on-site proppant outlet conduit 154 connected to an on-site dust-containing material storage unit 156. The on-site dust-containing material storage facility 150 also includes a second treatment fluid reservoir 158 including a second treatment outlet conduit 160 and a second treatment pump/flow controller 162. The second treatment outlet conduit 160 is connected to the dust-containing material transloading outlet conduit 154 at a second treatment end unit 164, where the second treatment end unit 164 may be an injector, a sprayer, or any other liquid injection system for introducing a liquid into a solid particulate material.

The on-site fracturing fluid mixing/storage facility 170 includes the on-site dust-containing material storage unit 156 having a dust-containing material feed conduit 174 connected to a fracturing fluid mixing/storage unit 176. The on-site fracturing fluid mixing/storage facility 170 also includes a third treatment fluid reservoir 178 including a third treatment outlet conduit 180 and a third treatment pump/flow controller 182. The third treatment outlet conduit 180 is connected to the dust-containing material transloading outlet conduit 174 at a third treatment end unit 184, where the third treatment end unit 174 may be an injector, a sprayer, or any other liquid injection system for introducing a liquid into a solid particulate material. The on-site fracturing fluid mixing/storage facility 170 also includes a fracturing fluid storage unit 186 having a fracturing fluid outlet conduit 188 and a fracturing fluid pump/flow controller 190.

It should be recognized that the treatment pump/flow controllers are adapted to introduce the treating composition into the dust-containing material (e.g., proppant) at a controlled rate, while the dust-containing material conduits are shown as a closed conduits, these conduits may include open ends or may simply be a flow dust-containing material from one unit to the next unit and may be responsible for producing dust-containing material dust.

Proppant Manufacturing/Production

Figure 2A:
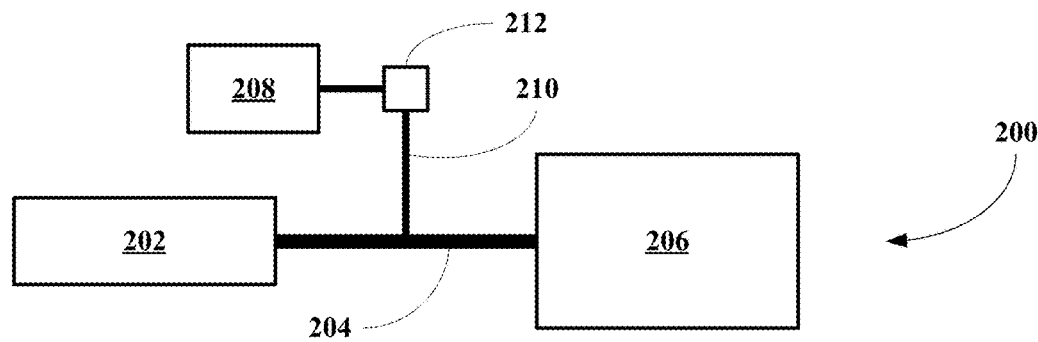
FIG. 2A depicts an embodiment of an apparatus for reducing proppant dust during proppant manufacturing operations.

Referring now to FIG. 2A, an embodiment of proppant manufacturing/production facility, generally 200, is shown to include a proppant manufacturing unit 202 having a proppant manufacturing outlet conduit 204 connected to a manufacturing facility storage unit 206. The proppant manufacturing/production facility 200 further includes a treatment fluid reservoir 208 including a treatment outlet conduit 210 and a treatment pump/flow controller 212

Figure 2B:
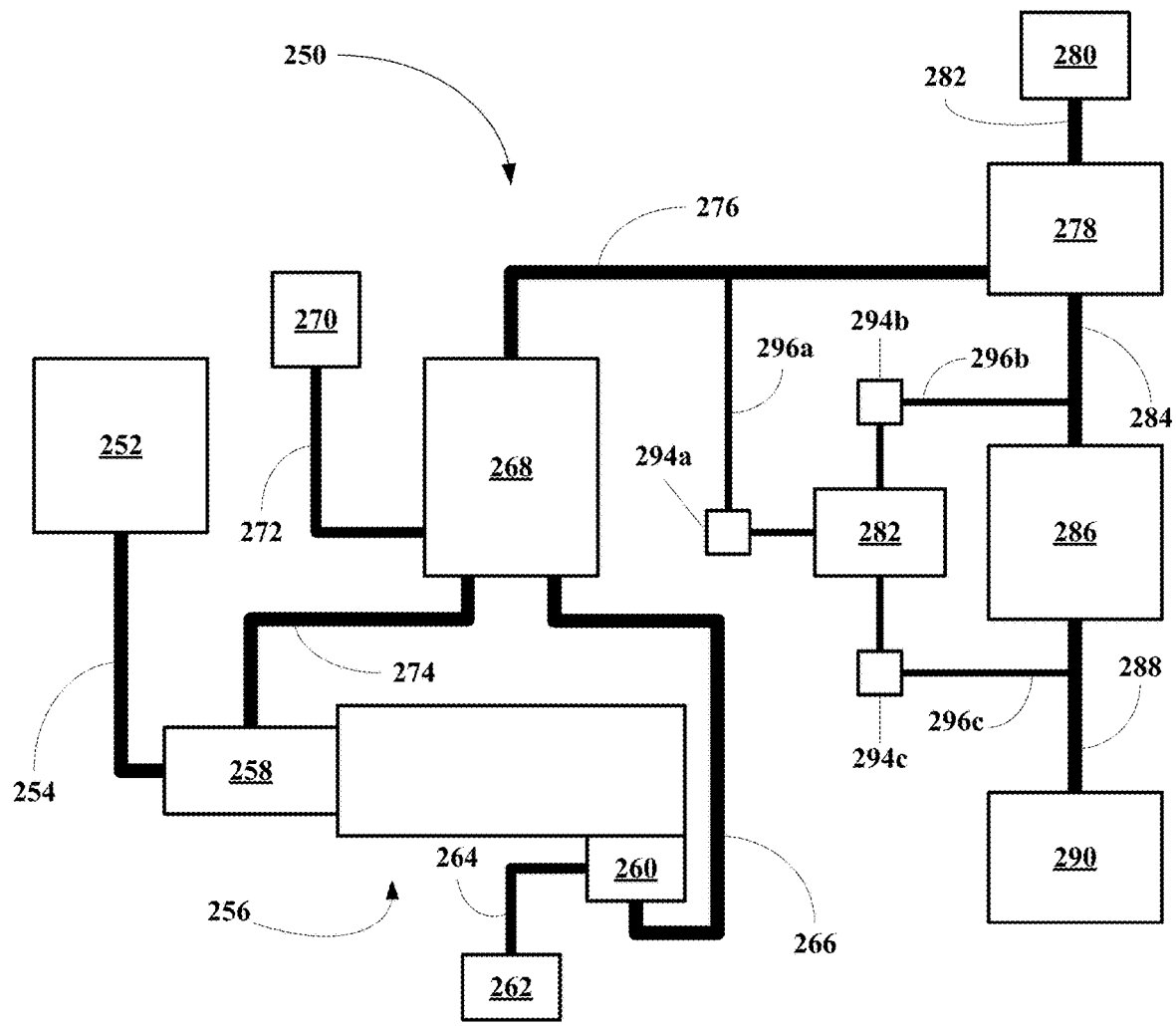
FIG. 2B depicts another embodiment of an apparatus for reducing proppant dust during proppant manufacturing operations.

Referring now to FIG. 2B, an embodiment of proppant manufacturing/production facility, generally 250, is shown to include a feed hopper 252 filled with a raw proppant material and a proppant feed conduit 254. The proppant manufacturing/production facility 250 also includes a commutating unit 256 including a feed unit 258, an outlet unit 260, a first air supply unit 262, a first air conduit 264, and a commutated proppant material outlet conduit 266. The proppant manufacturing/production facility 250 also includes an air classifier 268. The air classifier 268 include a second air supply unit 270, a second air conduit 272, a proppant return conduit 274, and a final proppant material outlet conduit 276. The commutated proppant material outlet conduit 266 is connect to the classifier 268. In the classifier 268, air supplied by the first air supply unit 270 to the classifier 268 via the conduit 272 is used to separate the proppant material based on particle weight so that the heavier particles fall out of the classifier 268 and returned to the commutating unit feed unit 258 for further commutating. The proppant manufacturing/production facility 250 also includes a dust collector 278 and an associated blower 280 supply air to the dust collector 278 via a blower conduit 282 and a final proppant product conduit 284. The proppant manufacturing/production facility 250 also includes a storage unit 286, a transfer conduit 288 and a transport unit 290. The proppant manufacturing/production facility 250 also includes a treating reservoir 292, three treatment pump/flow controllers 294*a-c* and three treatment conduits 296*a-c*. The final proppant product conduit 284 interconnects the dust collector 278 and the storage unit 286. The treatment pump/flow controllers 294*a-c* supply a treating composition of this invention to one of three potential treating location in the proppant manufacturing/production facility 250. While the exact locations of the treatment may be different than shown here, the locations represent embodiments most easily implemented without major disruption to the facility 250. The first conduit 296*a* and the first controller 294*a* may introduce a dust control composition of this disclosure as the commutated proppant material proceeds from the classifier 268 to the collector 278 via the conduit 276. The second conduit 296*b* and the second controller 294*c* may introduce a dust control composition of this disclosure as the final proppant material proceeds from the collector 278 to the storage uni 286 via the conduit 284. The third conduit 296*c* and the third controller 294*c* may introduce a dust control composition of this disclosure as the final proppant material proceeds from the storage unit 286 to the transportation unit 290 via the conduit 288. Again, the composition may be introduced into the proppant using an injector, a sprayer, or any other liquid injection system for introducing a liquid into a solid particulate material.

Again, it should be recognized that the treatment pump/flow controllers are adapted to introduce the treating composition into the proppant at a controlled rate, while the proppant conduits are shown as a closed conduits, these conduits may include open ends or may simply be a flow proppant from one unit to the next unit and may be responsible for producing proppant dust.

Proppant Transloading

Figure 3:
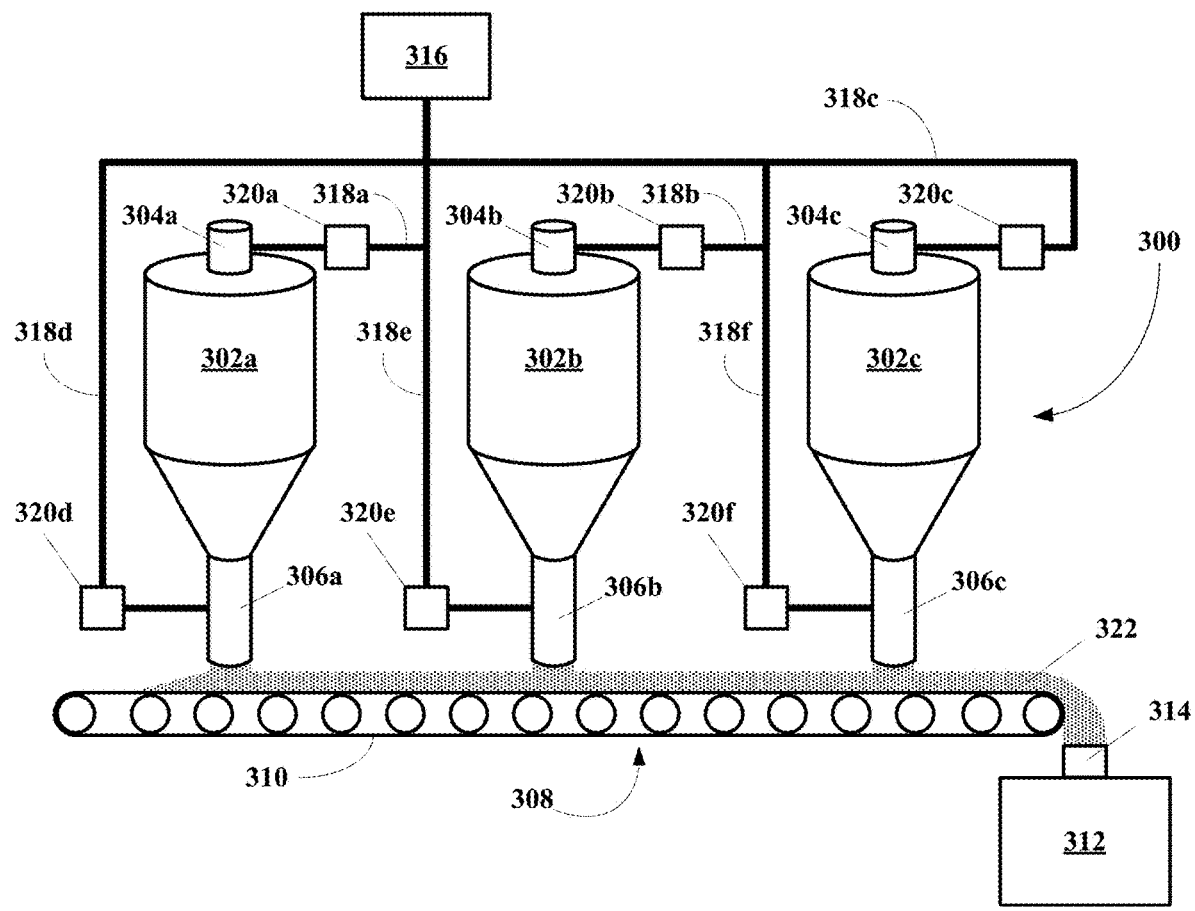
FIG. 3 depicts an embodiment of an apparatus for reducing proppant dust during proppant transloading operations.

Referring now to FIG. 3, an embodiment of transloading facility 300 includes three proppant storage silos 302*a-c*, three silo feed units 304*a-c*, three silo discharge units 306*a-c*, a conveyor belt unit 308 including a conveyor belt 310, and a transport unit 312 including a feed unit 314. The transloading facility 300 also includes a treating composition reservoir 316, six treating conduits 318*a-f*, and six treatment pump/flow controllers 320*a-f*. In this embodiment, the treating composition may be applied at six locations within the transloading facility 300, but the treating composition need not be applied to all of the locations and may be applied to the silo feed units 304*a-c*, or the silo discharge units 306*a-c*, or both. The first conduit 318*a* and the first controller 320*a* may introduce the treating composition into the first silo feed unit 304*a*; the second conduit 318*b* and the first controller 320*b* may introduce the treating composition into the second silo feed unit 304*b*; and the third conduit 318*c* and the third controller 320*c* may introduce the treating composition into the third silo feed unit 304*c*. The fourth conduit 318*d* and the fourth controller 320*d* may introduce the treating composition into the fourth silo discharge unit 306*d*; the fifth conduit 318*e* and the fifth controller 320*e* may introduce the treating composition into the fifth silo discharge unit 306*e*; and the sixth conduit 318*f* and the sixth controller 320*f* may introduce the treating composition into the sixth silo discharge unit 306*f*. By treating at these location, the treated proppant 322 conveyed on the conveyor belt 310 and entering into the feed unit 314 of the transportation unit 312 will produce less dust.

Of course, it should be recognized that the amount of treating composition introduced at each location may be the same or different provided that the overall treating composition introduced into the proppant in the three silos is within the effective treating amount to reduce, substantially reduce or completely reduce proppant dust during proppant transloading. Again, the composition may be introduced into the proppant using an injector, a sprayer, or any other liquid injection system for introducing a liquid into a solid particulate material.

Again, it should be recognized that the treatment pump/flow controllers are adapted to introduce the treating composition into the proppant at a controlled rate, while the proppant conduits are shown as a closed conduits, these conduits may include open ends or may simply be a flow proppant from one unit to the next unit and may be responsible for producing proppant dust.

Proppant Vehicle Loading

Figure 4A:
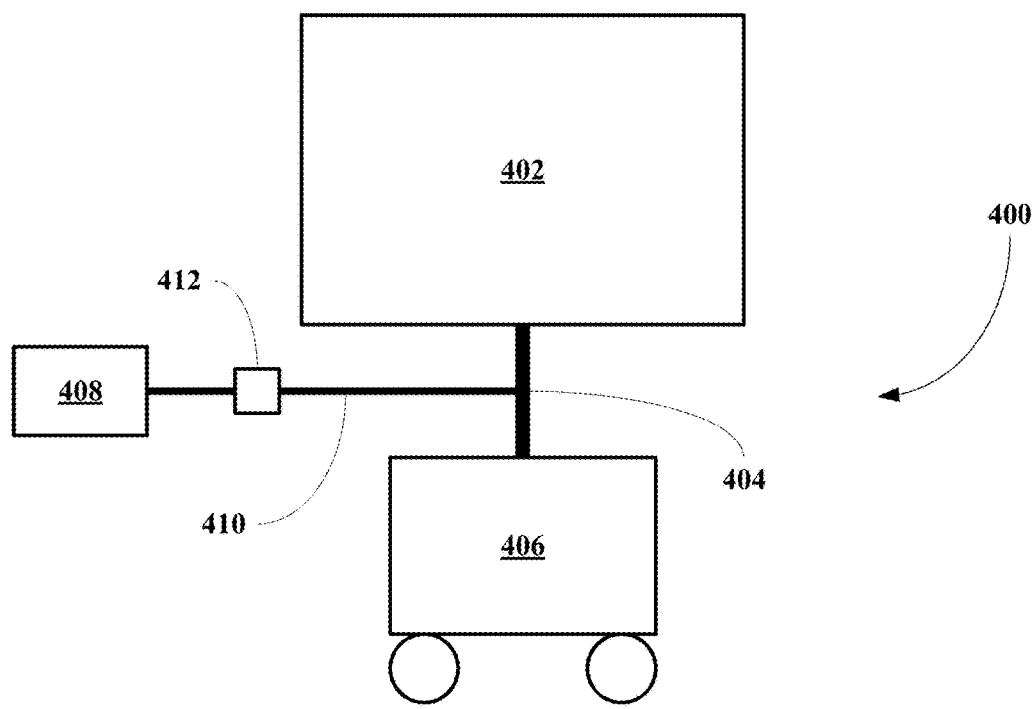
FIG. 4A depicts an embodiment of an apparatus for reducing proppant dust during proppant vehicle loading operations.
Figure 4B:
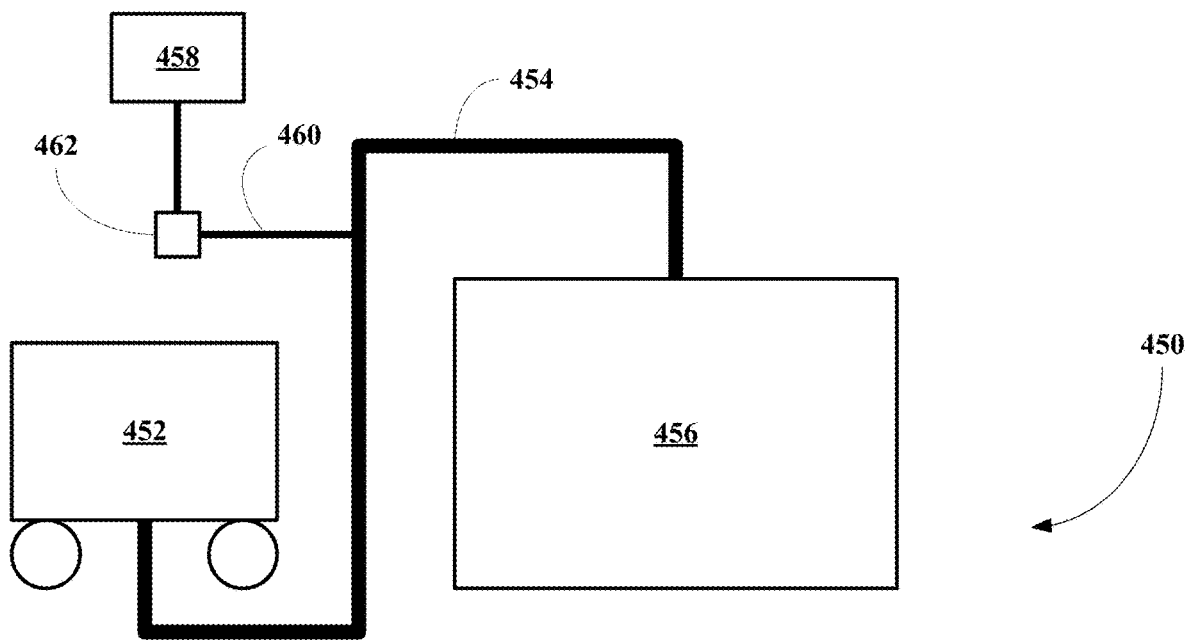
FIG. 4B depicts another embodiment of an apparatus for reducing proppant dust during proppant vehicle unloading operations.

Referring now to FIG. 4A, an embodiment of a proppant vehicle loading apparatus, generally 400, is shown to include a proppant storage 402 having a proppant transfer conduit 404 connected to a proppant transportation vehicle 406. The apparatus 400 also includes a treatment fluid reservoir 408 including a treatment outlet conduit 410 and a treatment pump/flow controller 412. Again, the composition may be introduced into the proppant using an injector, a sprayer, or any other liquid injection system for introducing a liquid into a solid particulate material.

Again, it should be recognized that the treatment pump/flow controllers are adapted to introduce the treating composition into the proppant at a controlled rate, while the proppant conduits are shown as a closed conduits, these conduits may include open ends or may simply be a flow proppant from one unit to the next unit and may be responsible for producing proppant dust.

Proppant Vehicle Unloading

Referring now to FIG. 4A, an embodiment of a proppant vehicle unloading apparatus, generally 450, is shown to include a proppant transportation vehicle 452 having a proppant transfer conduit 454 connected to a proppant storage 456. The apparatus 450 also includes a treatment fluid reservoir 458 including a treatment outlet conduit 460 and a treatment pump/flow controller 462. Again, the composition may be introduced into the proppant using an injector, a sprayer, or any other liquid injection system for introducing a liquid into a solid particulate material.

On-Site Fracturing Fluid Mixing/Storage Facility

Figure 5:
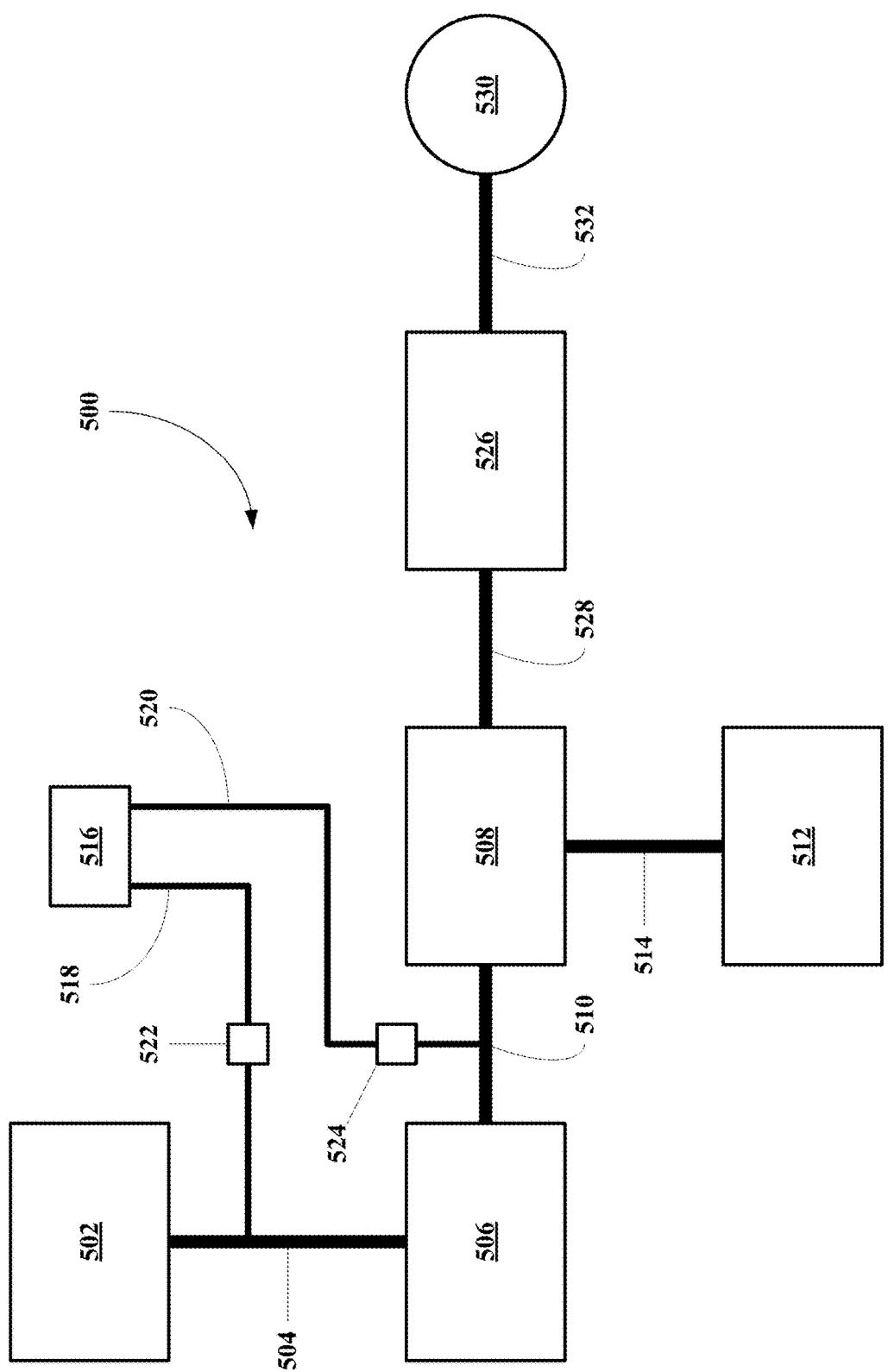
FIG. 5 depicts an embodiment of an apparatus for reducing proppant dust during onsite fracturing operations.

Referring now to FIG. 5, an embodiment of an on-site fracturing fluid mixing/storage facility 500 includes a proppant transportation vehicle 502 having a proppant transfer conduit 504 connected to an on-site proppant storage unit 506. The on-site proppant storage unit 506 is connected to a fracturing fluid mixing unit 508 via a proppant feed conduit 510. A fracturing base fluid storage unit 512 is connected to the fracturing fluid mixing unit 508 via a fluid conduit 514. The facility 500 also includes a treating composition reservoir 516 including two treating conduits 518 and 520 and two treatment pump/flow controllers 522 and 524. The conduit 518 and controller 522 may introduce the treating composition at controlled rate into the transfer conduit 504, while the conduit 520 and controller 524 may introduce the treating composition at controlled rate into the transfer conduit 510. The facility 500 also includes a stirred fracturing fluid reservoir 526 connected to the fracturing fluid mixing unit 508 via a fracturing fluid conduit 528, which is turn is connected to a well 530 via a well fracturing fluid conduit 532.

Again, it should be recognized that the treatment pump/flow controllers are adapted to introduce the treating composition into the proppant at a controlled rate, while the proppant conduits are shown as a closed conduits, these conduits may include open ends or may simply be a flow proppant from one unit to the next unit and may be responsible for producing proppant dust.

It should be recognized that some or all of the apparatuses and method steps described in FIG. 2-5 may be applied to any dust-containing material.

EXPERIMENTS OF THE DISCLOSURE

Dust Control Test Sample Preparation/Mixing:

The following steps lay out the process used to treat a proppant with a proppant dust suppression composition of this disclosure in a laboratory scale:
1. Measure out 600 g of proppant
2. Measure desired dust control additive. Conversion from field to lab scale:
   Field conc. gal per ton/2.4=lab conc.
   Example:
   0.36 gal/ton/2.4=0.15% lab conc.
   0.15% conversion to mL=0.15/100×600 g=1.08 mL
3. Pour the 600 g of proppant into a 1 L jar
4. Use an overhead mixer to mix the proppant at 1200 rpm max
5. Increase rpm speed and introduce dust control additive to the proppant
6. Mix for 2-3 minutes (simulates spray unit in field application)
7. Move the jar side to side while mixing so the proppant gets properly coated Test Procedure The following steps lay out the process used to perform lab scale tests of the effectiveness of proppant dust suppression compositions of this disclosure:
1. Wipe down the dust control apparatus to get rid of any residual dust
2. Weigh out a blank filter paper record as $M_i$=initial mass (g)
3. Insert the filter paper inside the dust control apparatus
4. Close the dust control apparatus
5. Load 600 g of untreated proppant into the funnel
6. Leave air compressor on for continuous air fill
7. Set pressure to 120 psi and turn on vacuum 8. Blast the sand out of the tubing with the aid of the compression gun
9. Aim at the metal target. Record the time it takes for sand leave the funnel called discharge time
10. Turn off the compressor after all the sand has been discharged
11. Leave the vacuum on for 5 minutes after discharge time
12. Weigh the filter paper record as $M_f$=final mass
13. Repeat steps for treated proppant after vacuuming out proppant Calculating Percent Reduction The effectiveness of the proppant dust suppression compositions of this disclosure is measured according to the following formula:

(Treated Proppant($M_f$−$M_i$)/Untreated Proppant($M_f$−$M_i$)−1)×100

Example 1

This example illustrates the effect on the use of 0.10% v/w of a coating composition has on proppant dust production. The coating and substrate are a treating composition including rapeseed oil and a sorbitan based ester composition (here a sorbitan triolate composition) on the dust control and flow when coating 100 mesh dustier sand currently pumped in West Texas.

TABLE II

Results of Treatment with 0.10 % v/w of Different Treating Compositions

| Rapeseed Oil (vol. %) | Sorbitan Triolate (vol. %) | Flow Time (sec) | Dust Reduction (%) |
|---|---|---|---|
| 100.0 | 0.0 | 85 | 93.2 |
| 99.5 | 0.5 | 106 | 72.9 |
| 99.0 | 1.0 | 106 | 79.9 |
| 95.0 | 5.0 | 110 | 72.7 |
| 90.0 | 10.0 | 116 | 70.4 |
| 85.0 | 15.0 | 107 | 70.2 |
| 80.0 | 20.0 | 113 | 76.4 |
| 70.0 | 30.0 | 90 | 71.0 |

Example 2

This example illustrates the effect on the use of 0.15% v/w of a coating composition has on proppant dust production. The coating and substrate are a treating composition including rapeseed oil and a sorbitan based ester composition (here a sorbitan triolate composition) on the dust control and flow when coating 100 mesh dustier sand currently pumped in West Texas.

TABLE III

Results of Treatment with 0.15 % v/w of Different Treating Compositions

| Rapeseed Oil (vol. %) | Sorbitan Triolate (vol. %) | Flow Time (sec) | Dust Reduction (%) |
|---|---|---|---|
| 100.0 | 0.0 | Screened Out | NA |
| 99.5 | 0.5 | Screened Out | NA |
| 99.0 | 1.0 | Screened Out | NA |
| 95.0 | 5.0 | 37 | 76.4 |
| 90.0 | 10.0 | 37 | 73.6 |
| 85.0 | 15.0 | 32 | 73.5 |
| 80.0 | 20.0 | 48 | 76.7 |
| 70.0 | 30.0 | 106 | 78.6 |

Example 3

This example illustrates the effect on the use of 0.20% v/w of a coating composition has on proppant dust production. The coating and substrate are a treating composition including rapeseed oil and a sorbitan based ester composition (here a sorbitan triolate composition) on the dust control and flow when coating 100 mesh dustier sand currently pumped in West Texas.

TABLE IV

Results of Treatment with 0.20 % v/w of Different Treating Compositions

| Rapeseed Oil (vol. %) | Sorbitan Triolate (vol. %) | Flow Time (sec) | Dust Reduction (%) |
|---|---|---|---|
| 100.0 | 0.0 | Screened Out | NA |
| 99.5 | 0.5 | Screened Out | NA |
| 99.0 | 1.0 | Screened Out | NA |
| 95.0 | 5.0 | 37 | 83.8 |
| 90.0 | 10.0 | 37 | 82.3 |
| 85.0 | 15.0 | 40 | 77.9 |
| 80.0 | 20.0 | 45 | 77.9 |
| 70.0 | 30.0 | 56 | 89.5 |

The data shows that the compositions of this disclosure reduce proppant dust generation by as much as 90% or more by coating the surface of the proppant with concentrations as low as 0.1% v/w.

The data also shows that the addition of some sorbital based esters such as sorbitan triolate with a Hydrophile-Lipophile Balance of 1.8 deduces a pour point of the coating material to −25° F. using 70 vol. % rapeseed oil and 30 vol. % sorbitan triolate.

The data also shows as the ratio of sorbitan ester to oil increases in the treating composition, the flowability of the proppant in some cases increases, up to a critical concentration and then decreases again. In certain embodiments, the compositions include between about 95 vol. % and about 80 vol. % of at least one oil and between about 5 vol. % and about 20 vol. % of alcohol sugar ester (e.g., sorbitan ester) at treating levels between 0.15% v/w to about 0.5% v/w.

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. An oil-based dust suppression composition comprising:
   (a) at least one sugar alcohol ester, and
   (b) at least one glyceride,
   wherein:
   the oil-based dust suppression composition is free or substantially free of water or an aqueous solution,
   the oil-based dust suppression composition reduces dust by about 30% to about 100% when applied to dust-containing materials, and
   the at least one sugar alcohol ester improves flow/ability of the dust-containing materials treated with the oil-based dust suppression composition.

2. The composition of claim 1, further comprising:
   (c) at least one pour point depressant comprising a polymethacrylate, a polyacrylate, an acrylate-styrene copolymer, an esterified olefin polymer or copolymer, a styrene maleic anhydride copolymer, an alkylated polystyrene, a vinyl acetate-fumarate copolymer, a poly alpha olefin, or mixtures thereof.

3. The composition of claim 1, wherein the composition comprises:
   between about 95 vol,% and about 50 vol. % of at least one glyceride and between 5 vol. % and 50 vol. % of at least one sugar alcohol ester, or
   between about 90 vol. % and about 51 vol. % of at least one glyceride and between 10 vol. % and 50 vol. % of at least one sugar alcohol ester, or
   between about 80 vol. % and about 50 vol. % of at least one glyceride and between 20 vol. % and 50 vol. % of at least one sugar alcohol ester, or
   between about 70 vol. % and about 50 vol. % of at least one glyceride and between 30 vol. % and 50 vol. % of at least one sugar alcohol ester.

4. The composition of claim 3, further comprising:
   between about 0.1 wt,% and about 5 wt. % of at least one pour point depressant comprising a polymethacrylate, a polyacrylate, an acrylate-styrene copolymer, an esterified olefin polymer or copolymer, a styrene maleic anhydride copolymer, an alkylated polystyrene, and a vinyl acetate-fumarate copolymer, a poly alpha olefin, or mixtures thereof, wherein the weight percentages are adjusted to add to 100 wt. %.

5. The composition of claim 1, wherein:
   the at least one glyceride comprises at least one compound of the general formula (I):

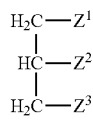

(I)

$Z^1$, $Z^2$, and $Z^3$ are hydroxyl groups or ester groups having the formula —OC(=O)R,
     each R group is independently a $C_4$-$C_{40}$ hydrocarbyl group, and
   $Z^1$, $Z^2$, and $Z^3$ are not all hydroxyl groups; and
   the at least one sugar alcohol ester comprises at least one compound of the general formula (III):

$$Z^4OCH_2(CHOZ^5)_nCH_2OZ^6 \quad (III)$$

$Z^4$, each $N^5$, and $N^6$ are hydroxyl groups or ester groups having the formula —OC(=O)R,
     each R group is a $C_4$-$C_{40}$ hydrocarbyl group,
   $Z^4$, $Z^5$, and $Z^6$ are not all hydroxyl groups,
   n is an integer having a value between 2 and 8, and cyclic derivatives thereof.

6. The composition of claim 5, wherein the at least one glyceride comprises a monoglyceride of formula (IA), a diglyceride of formula (IB), a triglyceride of formula (IC), or mixtures thereof:

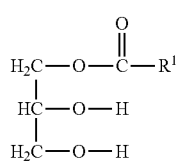

(IA)

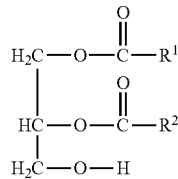

(IB)

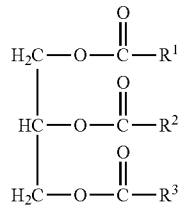

(IC)

$R^1$, $R^2$, and $R^3$ are independently $C_4$-$C_{40}$ hydrocarbyl groups.

7. The composition of claim 6, wherein:
   the —C(=O)—$R^1$, —C(=O)—$R^2$, and —C(=O)—$R^3$ moieties are derived from $C_4$-$C_{40}$ fatty acids.

8. The composition of claim 1, wherein:
   the at least one glyceride comprising a coconut oil, a corn oil, a cottonseed oil, an olive oil, a palm oil, a peanut oil, a rapeseed oil, a safflower oil, a sesame oil, a soybean oil, a sunflower oil, an almond oil, a beech nut oil, a brazil nut oil, a cashew oil, a hazelnut oil, a macadamia oil, a mongongo nut oil, a pecan oil, a pine nut oil, a pistachio oil, a walnut oil, a grapefruit seed oil, a bitter gourd oil, a bottle gourd oil, a buffalo gourd oil, a butternut squash seed oil, an egusi seed oil, a pumpkin seed oil, a watermelon seed oil, an açai oil, black seed oil, a blackcurrant seed oil, a borage seed oil, an evening primrose oil, a flaxseed oil, an amaranth oil, an apricot oil, an apple seed oil, an argan oil, an avocado oil, a babassu oil, a ben oil, a borneo tallow nut oil, a cape chestnut oil, a carob pod oil, an algaroba oil, a cocoa butter, a cocklebur oil, a cohune oil, a coriander seed oil, a date seed oil, a dika oil, a grape seed oil, a hemp oil, a kapok seed oil, a kenaf seed oil, a lallemantia oil, a mafura oil, marula oil, a meadowfoam seed oil, a mustard oil, a niger seed oil, a poppyseed oil, a nutmeg butter, an okra seed oil, a papaya seed oil, a perilla seed oil, a persimmon seed oil, a pequi oil, a pili nut oil, a pomegranate seed oil, a poppyseed oil, a pracaxi oil, a virgin pracaxi oil, a prune kernel oil, a quinoa oil, a ramtil oil, a rice bran oil, a royle oil, a shea butter, a sacha inchi oil, a sapote oil, a seje oil, a taramira oil, a tea seed oil, a camellia oil, a thistle oil, a tigernut oil, a tigernut-sedge oil, a tobacco seed oil, a tomato seed oil, a wheat germ oil, or mixtures thereof,
   the at least one sugar alcohol ester comprising an erythritol ester, a threitol ester, an arabitol ester, a xylitol ester, a ribitol ester, a mannitol ester, a sorbitol ester, a galactitol ester, a fucitol ester, an iditol ester, an inositol ester, a volemitol ester, an isomalt ester, a maltitol ester, a lactitol ester, a maltotriitol ester, a maltotetraitol ester, a cyclic derivative thereof, or mixtures thereof, and
   the dust-containing materials comprising proppant materials, particulate ceramic or metal oxide materials, particulate filler materials, particulate glass manufacturing materials, particulate carbonaceous materials, particulate abrasive materials, particulate polymeric materials, particulate concrete materials, particulate scouring materials, particulate metal materials, particulate plant materials, other solid materials that contain dust, or mixtures thereof.

9. The composition of claim 8, wherein:

the at least one glyceride comprising a coconut oil, a corn oil, a cottonseed oil, an olive oil, a palm oil, a peanut oil, a rapeseed oil, a safflower oil, a sesame oil, a soybean oil, a sunflower oil, an almond oil, a grapefruit seed oil, an avocado oil, a grape seed oil, a hemp oil, or mixtures thereof, the at least one sugar alcohol ester comprising at least one sugar alcohol fatty acid ester, the particulate metal materials comprising particulate iron and iron alloys, particulate aluminum and aluminum alloys, particular copper and copper alloys, or mixtures thereof, the metal oxide materials comprising actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, zeolites, ceramic structures prepared from one or more of these oxides and mixed metal oxides including two or more of the above listed metal oxides, or mixtures thereof, the particulate plant materials comprising walnut shells, pecan shells, peanut shells, shells for other hard shelled seed forming plants, ground wood or other fibrous cellulosic materials, or mixtures thereof, the particulate abrasive and scouring materials comprising particulate diamond, other particulate precious stones, semi-precious stones, particulate carborundum, particulate tungsten, or mixtures thereof, the particulate carbonaceous materials comprising all type of particulate coal, particulate lignite, particulate gilsonite, particulate peat, particulate saw dust, other carbonaceous materials, or mixtures thereof, and the particulate filler materials comprising carbon blacks, fumed silicas, zeolites, or mixtures thereof.

10. The composition of claim 9, wherein:

the at least one glyceride comprising a coconut oil, a corn oil, a cottonseed oil, an olive oil, a palm oil, a peanut oil, a rapeseed oil, a safflower oil, a sesame oil, a soybean oil, a sunflower oil, an almond oil, and an avocado oil, or mixtures thereof, and the at least one sugar alcohol fatty acid ester comprising at least one sorbitol and/or sorbitan fatty acid ester.

11. An oil-based dust suppression composition comprising:

(a) at least one vegetable oil, and
(b) at least one sugar alcohol ester, wherein:
the oil-based dust suppression composition is free or substantially free of water or an aqueous solution,
the oil-based dust suppression composition reduces dust by about 30% to about 100% when applied to dust-containing materials, and
the at least one sugar alcohol ester improves flowability of the dust-containing materials treated with the oil-based dust suppression composition.

12. The composition of claim 11, further comprising:

(c) at least one pour point depressant comprising a polymethacrylate, a polyacrylate, an acrylate-styrene copolymer, an esterified olefin polymer or copolymer, a styrene maleic anhydride copolymer, an alkylated polystyrene, a vinyl acetate-fumarate copolymer, a poly alpha olefin, or mixtures thereof.

13. The composition of claim 12, wherein the composition comprises:

between about 94.95 vol. % and about 47.5 vol. % of at least one glyceride and between 4.95 vol. % and 47.5 vol. % of at least one sugar alcohol ester and between about 0.1 wt. % and about 5 wt. % of at least one pour point depressant, or between about 89.95 vol. % and about 47.5 vol. % of at least one glyceride and between 9.95 vol. % and 47.5 vol. % of at least one sugar alcohol ester and between about 0.1 wt. % and about 5 wt. % of at least one pour point depressant, or between about 79.95 vol. % and about 47.5 vol. % of at least one glyceride and between 19.95 vol. % and 47.5 vol. % of at least one sugar alcohol ester and between about 0.1 wt. % and about 5 wt. % of at least one pour point depressant, or between about 69.95 vol. % and about 47.5 vol. % of at least one glyceride and between 29.95 vol. % and 47.5 vol. % of at least one sugar alcohol ester and between about 0.1 wt. % and about 5 wt. % of at least one pour point depressant.

14. The composition of claim 13, wherein:

the at least one vegetable oil comprising a coconut oil, a corn oil, a cottonseed oil, an olive oil, a palm oil, a peanut oil, a rapeseed oil, a safflower oil, a sesame oil, a soybean oil, a sunflower oil, an almond oil, a beech nut oil, a brazil nut oil, a cashew oil, a hazelnut oil, a macadamia oil, a mongongo nut oil, a pecan oil, a pine nut oil, a pistachio oil, a walnut oil, a grapefruit seed oil, a bitter gourd oil, a bottle gourd oil, a buffalo gourd oil, a butternut squash seed oil, an egusi seed oil, a pumpkin seed oil, a watermelon seed oil, an açai oil, black seed oil, a blackcurrant seed oil, a borage seed oil, an evening primrose oil, a flaxseed oil, an amaranth oil, an apricot oil, an apple seed oil, an argan oil, an avocado oil, a babassu oil, a ben oil, a borneo tallow nut oil, a cape chestnut oil, a carob pod oil, an algaroba oil, a cocoa butter, a cocklebur oil, a cohune oil, a coriander seed oil, a date seed oil, a dika oil, a grape seed oil, a hemp oil, a kapok seed oil, a kenaf seed oil, a lallemantia oil, a mafura oil, marula oil, a meadowfoam seed oil, a mustard oil, a niger seed oil, a poppyseed oil, a nutmeg butter, an okra seed oil, a papaya seed oil, a perilla seed oil, a persimmon seed oil, a pequi oil, a pili nut oil, a pomegranate seed oil, a poppyseed oil, a pracaxi oil, a virgin pracaxi oil, a prune kernel oil, a quinoa oil, a ramtil oil, a rice bran oil, a royle oil, a shea butter, a sacha inchi oil, a sapote oil, a seje oil, a taramira oil, a tea seed oil, a camellia oil, a thistle oil, a tigernut oil, a tigernut-sedge oil, a tobacco seed oil, a tomato seed oil, a wheat germ oil, or mixtures thereof, the at least one sugar alcohol ester comprising an erythritol ester, a threitol ester, an arabitol ester, a xylitol ester, a ribitol ester, a mannitol ester, a sorbitol ester, a galactitol ester, a fucitol ester, an iditol ester, an inositol ester, a volemitol ester, an isomalt ester, a maltitol ester, a lactitol ester, a maltotriitol ester, a maltotetraitol ester, a cyclic derivative thereof, or mixtures thereof, and the dust-containing materials comprising proppant materials, particulate ceramic or metal oxide materials, particulate filler materials, particulate glass manufacturing materials, particulate carbonaceous materials, particulate abrasive materials, particulate polymeric materials, particulate concrete materials, particulate scouring materials, particulate metal materials, particulate plant materials, other solid materials that contain dust, or mixtures thereof.

15. The composition of claim 14, wherein:

the at least one vegetable oil comprising a coconut oil, a corn oil, a cottonseed oil, an olive oil, a palm oil, a peanut oil, a rapeseed oil, a safflower oil, a sesame oil, a soybean oil, a sunflower oil, an almond oil, a grapefruit seed oil, an avocado oil, a grape seed oil, a hemp oil, or mixtures thereof, the ester of the at least one sugar alcohol ester comprising a fatty acid, the particulate metal materials comprising particulate iron and iron alloys, particulate aluminum and aluminum alloys, particular copper and copper alloys, or mixtures thereof, the metal oxide materials comprising actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, zeolites, ceramic structures prepared from one or more of these oxides and mixed metal oxides including two or more of the above listed metal oxides, or mixtures thereof, the particulate plant materials comprising walnut shells, pecan shells, peanut shells, shells for other hard shelled seed forming plants, ground wood or other fibrous cellulosic materials, or mixtures thereof, the particulate abrasive and scouring materials comprising particulate diamond, other particulate precious stones, semi-precious stones, particulate carborundum, particulate tungsten, or mixtures thereof, the particulate carbonaceous materials comprising all type of particulate coal, particulate lignite, particulate gilsonite, particulate peat, particulate saw dust, other carbonaceous materials, or mixtures thereof, and the particulate filler materials comprising carbon blacks, fumed silicas, zeolites, or mixtures thereof.

16. The composition of claim 15, wherein:

the at least one vegetable oil comprising a coconut oil, a corn oil, a cottonseed oil, an olive oil, a palm oil, a peanut oil, a rapeseed oil, a safflower oil, a sesame oil, a soybean oil, a sunflower oil, an almond oil, and an avocado oil, or mixtures thereof, and the at least one sugar alcohol fatty acid ester comprising at least one sorbitol and/or sorbitan fatty acid ester.

17. An oil-based dust suppression composition comprising:

(a) at least one vegetable oil comprising a coconut oil, a corn oil, a cottonseed oil, an olive oil, a palm oil, a peanut oil, a rapeseed oil, a safflower oil, a sesame oil, a soybean oil, a sunflower oil, an almond oil, a beech nut oil, a brazil nut oil, a cashew oil, a hazelnut oil, a macadamia oil, a mongongo nut oil, a pecan oil, a pine nut oil, a pistachio oil, a walnut oil, a grapefruit seed oil, a bitter gourd oil, a bottle gourd oil, a buffalo gourd oil, a butternut squash seed oil, an egusi seed oil, a pumpkin seed oil, a watermelon seed oil, an açaı oil, black seed oil, a blackcurrant seed oil, a borage seed oil, an evening primrose oil, a flaxseed oil, an amaranth oil, an apricot oil, an apple seed oil, an argan oil, an avocado oil, a babassu oil, a ben oil, a borneo tallow nut oil, a cape chestnut oil, a carob pod oil, an algaroba oil, a cocoa butter, a cocklebur oil, a cohune oil, a coriander seed oil, a date seed oil, a dika oil, a grape seed oil, a hemp oil, a kapok seed oil, a kenaf seed oil, a lallemantia oil, a mafura oil, marula oil, a meadowfoam seed oil, a mustard oil, a niger seed oil, a poppyseed oil, a nutmeg butter, an okra seed oil, a papaya seed oil, a perilla seed oil, a persimmon seed oil, a pequi oil, a pili nut oil, a pomegranate seed oil, a poppyseed oil, a pracaxi oil, a virgin pracaxi oil, a prune kernel oil, a quinoa oil, a ramtil oil, a rice bran oil, a royle oil, a shea butter, a sacha inchi oil, a sapote oil, a seje oil, a taramira oil, a tea seed oil, a camellia oil, a thistle oil, a tigernut oil, a tigernut-sedge oil, a tobacco seed oil, a tomato seed oil, a wheat germ oil, or mixtures thereof, (b) at least one sugar alcohol ester comprising an erythritol ester, a threitol ester, an arabitol ester, a xylitol ester, a ribitol ester, a mannitol ester, a sorbitol ester, a galactitol ester, a fucitol ester, an iditol ester, an inositol ester, a volemitol ester, an isomalt ester, a maltitol ester, a lactitol ester, a maltotriitol ester, a maltotetraitol ester, a cyclic derivative thereof, or mixtures thereof, and (c) at least one pour point depressant comprising a polymethacrylate, a polyacrylate, an acrylate-styrene copolymer, an esterified olefin polymer or copolymer, a styrene maleic anhydride copolymer, an alkylated polystyrene, a vinyl acetate-fumarate copolymer, a poly alpha olefin, or mixtures thereof wherein:

the oil-based dust suppression composition is free or substantially free of water or an aqueous solution, the oil-based dust suppression composition reduces dust by about 30% to about 100% when applied to dust-containing materials, and the at least one sugar alcohol ester improves flowability of the dust-containing materials treated with the oil-based dust suppression composition.

18. The composition of claim 17, wherein the composition comprises:

between about 94.95 vol. % and about 47.5 vol. % of at least one glyceride and between 4.95 vol. % and 47.5 vol. % of at least one sugar alcohol ester and between about 0.1 wt. % and about 5 wt. % of at least one pour point depressant, or between about 89.95 vol. % and about 47.5 vol. % of at least one glyceride and between 9.95 vol. % and 47.5 vol. % of at least one sugar alcohol ester and between about 0.1 wt. % and about 5 wt. % of at least one pour point depressant, or between about 79.95 vol. % and about 47.5 vol. % of at least one glyceride and between 19.95 vol. % and 47.5 vol. % of at least one sugar alcohol ester and between about 0.1 wt. % and about 5 wt. % of at least one pour point depressant, or between about 69.95 vol. % and about 47.5 vol. % of at least one glyceride and between 29.95 vol. % and 47.5 vol. % of at least one sugar alcohol ester and between about 0.1 wt. % and about 5 wt. % of at least one pour point depressant.

19. The composition of claim 18, wherein:

the dust-containing materials comprising proppant materials, particulate ceramic or metal oxide materials, particulate filler materials, particulate glass manufacturing materials, particulate carbonaceous materials, particulate abrasive materials, particulate polymeric materials, particulate concrete materials, particulate scouring materials, particulate metal materials, particulate plant materials, other solid materials that contain dust, or mixtures thereof.

20. The composition of claim 19, wherein:

the at least one vegetable oil comprising a coconut oil, a corn oil, a cottonseed oil, an olive oil, a palm oil, a peanut oil, a rapeseed oil, a safflower oil, a sesame oil, a soybean oil, a sunflower oil, an almond oil, and an avocado oil, or mixtures thereof, the at least one sugar alcohol fatty acid ester comprising at least one sorbitol and/or sorbitan fatty acid ester, the particulate metal materials comprising particulate iron and iron alloys, particulate aluminum and aluminum alloys, particular copper and copper alloys, or mixtures thereof, the metal oxide materials comprising actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, zeolites, ceramic structures prepared from one or more of these oxides and mixed metal oxides including two or more of the above listed metal oxides, or mixtures thereof, the particulate plant materials comprising walnut shells, pecan shells, peanut shells, shells for other hard shelled seed forming plants, ground wood or other fibrous cellulosic materials, or mixtures thereof, the particulate abrasive and scouring materials comprising particulate diamond, other particulate precious stones, semi-precious stones, particulate carborundum, particulate tungsten, or mixtures thereof, the particulate carbonaceous materials comprising all type of particulate coal, particulate lignite, particulate gilsonite, particulate peat, particulate saw dust, other carbonaceous materials, or mixtures thereof, and the particulate filler materials comprising carbon blacks, fumed silicas, zeolites, or mixtures thereof.

* * * * *